(12) United States Patent
Aucouturier et al.

(10) Patent No.: US 8,392,414 B2
(45) Date of Patent: Mar. 5, 2013

(54) HYBRID AUDIO-VISUAL CATEGORIZATION SYSTEM AND METHOD

(75) Inventors: Jean-Julien Aucouturier, Montlucon (FR); Pierre Roy, Paris (FR); Francois Pachet, Paris (FR)

(73) Assignee: Sony France S.A., Clichy la Garenne (FR)

( * ) Notice: Subject to any disclaimer, the term of this patent is extended or adjusted under 35 U.S.C. 154(b) by 184 days.

(21) Appl. No.: 11/690,553

(22) Filed: Mar. 23, 2007

(65) Prior Publication Data

US 2008/0040362 A1    Feb. 14, 2008

(30) Foreign Application Priority Data

Mar. 30, 2006    (EP) .................................... 06300310

(51) Int. Cl.
*G06F 17/30* (2006.01)
*G06K 9/62* (2006.01)

(52) U.S. Cl. ........................................ 707/736; 382/224
(58) Field of Classification Search ............... 707/1, 736
See application file for complete search history.

(56) References Cited

U.S. PATENT DOCUMENTS

| | | | |
|---|---|---|---|
| 6,847,980 B1 | 1/2005 | Benitez et al. | |
| 6,877,134 B1* | 4/2005 | Fuller et al. | 715/202 |
| 2002/0140843 A1 | 10/2002 | Tretter et al. | |
| 2003/0023421 A1* | 1/2003 | Finn et al. | 704/1 |
| 2003/0177503 A1* | 9/2003 | Sull et al. | 725/112 |
| 2004/0021683 A1* | 2/2004 | Huang et al. | 345/716 |
| 2004/0168118 A1* | 8/2004 | Wong et al. | 715/500.1 |
| 2006/0080335 A1* | 4/2006 | Freeborg et al. | 707/100 |
| 2007/0028171 A1* | 2/2007 | MacLaurin | 715/705 |

FOREIGN PATENT DOCUMENTS

WO    WO 2004/081814 A1    9/2004

OTHER PUBLICATIONS

Jean-Julien Aucouturier, et al., "Representing Musical Genre: A State of the Art", Journal of New Music Research, Swets & Zeitlinger, vol. 32, No. 1, Mar. 1, 2003, pp. 83-93, XP002365108.
Risto Sarvas, et al., "Metadata Creation System for Mobile Images", Proceedings of The 2nd International Conference on Mobile Systems, Applications, and Services Mobisys'04, Jun. 6-9, 2004, pp. 36-48, XP002393963.
Marc Davis, et al., "From Context to Content: Leveraging Context to infer Media Metadata", Proceedings of The 12th Annual ACM International Conference on Multimedia, Oct. 10-16, 2004, pp. 1-8, XP002374239.
Ye Wang, et al., "LyricAlly: Automatic Synchronization of Acoustic Musical Signals and Textual Lyrics", Department of Computer Science, Oct. 2004, 4 pages.
Kevin Skerrett, et al., "Evaluation of TRM Digital Fingerprinting Technology", Department of Computer Science, Apr. 2004, pp. 7-12.
Wei Chai, et al, "Using User Models in Music Information Retrieval Systems", Proceedings of International Symposium on Music Information Retrieval, Oct. 2000, 5 pages.

* cited by examiner

*Primary Examiner* — Tarek Chbouki
(74) *Attorney, Agent, or Firm* — Oblon, Spivak, McClelland, Maier & Neustadt, L.L.P.

(57) ABSTRACT

Meta-data (tags) for an audiovisual file can be generated by producing an initial estimate of the tags and then revising the estimate (notably to expand it and/or render it more precise) based on the assumption that the relationships which hold between the different tags for a set of manually-tagged training examples will also hold for the tags of the input file now being tagged. A fully-automatic method and system is a hybrid between signal-based and machine-learning approaches, because the initial tag estimate is based on the physical properties of the signal representing the audiovisual file. The initial tag estimate may be produced by inferring that the input content will have the same tags as those files of the same kind, in the training database, which have a global similarity to the input audiovisual file in terms of signal properties.

16 Claims, 11 Drawing Sheets

HYBRID AUDIO-VISUAL CATEGORIZATION SYSTEM AND METHOD

The present invention relates generally to the field of categorization of audiovisual works, notably for database systems, and, in particular, to the generation of meta-data for music files, image files, text files, e-books (i.e. spoken word files), video files, etc. (also known as the "tagging" of content files).

In recent years large numbers of content collections have been built up, often by service providers who, for a fee, allow users to access their collections (e.g. by downloading to a computer, mobile telephone, etc.), but also by individuals.

In a database, it is generally desirable to store a file for an audiovisual work in association with a number of descriptors (often called "tags" or "meta-data"). The meta-data can relate to low-level information, typically identifying physical features and associated feature values characterising the audiovisual work itself (e.g. for a music file, a feature could be "the mean of the first Mel Frequency Cepstrum Coefficient (MFCC) of the acoustic signal" and the corresponding feature value could be "5.23". Such feature-value information can be vector data, typically when a given function of the analysed signal is computed on short time-windows. This type of "low-level" meta-data is rarely seen by users. Users are generally more familiar with meta-data relating to high-level information describing human-perceptible attributes of the audiovisual work, e.g. "this song is rock music", "this image is of nature", etc.

These tags allow content in the database to be accessed in different ways, for example, they allow a user to browse stored music by category (e.g. songs in a particular genre, musical works involving a particular musical instrument, etc), to obtain recommendations of videos the user might like (e.g. videos having a particular combination of attributes), to filter the database according to some criterion (e.g. exclude all images showing people), etc.

The number of tags associated with an audiovisual file can be extremely large; for example, in the StreamMan project being implemented by Sony NetServices around 800 attributes of each musical work in a database are tagged. Moreover, the number of files in a database will typically be very large (e.g. several thousands). Thus, it can be extremely laborious to tag a content collection manually.

Some systems encourage a collaborative approach to manual tagging, inviting remote users connected to a network (e.g. the Internet) to supply tags for works in a database: for example, the website www.flickr.com enables users to contribute tags for images in a collection. However, where a large number of different users are manually generating tags for audiovisual content there is a probable lack of consensus regarding which tags should be assigned to particular properties of the audiovisual works. Accordingly, moves have been made to find automatic systems for generating tags for audiovisual content.

Many techniques have already been proposed for automatically producing descriptors for a musical work (or vocal work in general, i.e. including the spoken word) by looking at the acoustic signal representing that musical (or vocal) work. Similarly, many content-based retrieval techniques exist which involve the extraction of information on the attributes (e.g. the colour, the texture, rate of movement, etc.) of a still image or video. In general these approaches can be termed "signal-processing" based approaches.

Often the high-level attribute data (meta-data, tags) associated with an audiovisual work will be related to low-level features capable of being extracted from a signal representing the audiovisual work. For example, there is a reasonably good correlation between the timbre of a musical work and certain genre categories or extreme moods, such as "aggressive" or "warm". Similarly, there is a reasonably good correlation between the texture of an image and certain subject categories, such as "nature"; between the speed and extent of movement in frames of a video sequence and the genre "action"; etc. Thus, some prior proposals involve making an analysis of the features of the signal representing an audiovisual work, and predicting values for high-level attributes of the work by making inferences based on the signal's features.

However, audiovisual works can also be described using attribute data which is not "signal-related", such as attribute data which describes the work in terms of cultural or subjective criteria such as the emotional mood of the piece (romantic, agitated, . . . ), the type of action in a video (violent action, slow action, . . . ), etc. Moreover, sometimes the audiovisual work may have an attribute which, although it can be determined objectively, is nevertheless too complex to be readily determined by a machine. Known signal-processing based categorization systems tend to fail when attempting to generate these kinds of "cultural" or "complex" attribute data.

Signal-processing based approaches of the above-described type have limited precision and fail when it comes to determining cultural or subjective attributes which either bear little correlation with the music, text or image being described (e.g. the content of the lyrics, complex moods or associated situations), or represent very narrowly defined categories or sub-categories (e.g. an attribute which indicates that a song is in the genre California surf rock).

It is known that there are correlations between certain of the attributes possessed by audiovisual works of different kinds. For example, music having the attribute "genre=heavy metal" often also has the attributes "main instrument=electric guitar", "lyrics=social protest". "male singer" and "suitable as soundtrack accompanying violent action situations". Similarly, images having the attribute "colour=green" and "texture=vegetal" often also have the attribute "subject=nature". These correlations can be examined using machine learning or data-mining techniques, for example techniques where the correlations are learned by training a classifier such as a neural network, decision tree etc. However, these data mining techniques are generally used for evaluating the correlations that exist in a body of already-tagged audiovisual works.

Various well-known algorithms exist for training classifiers of different types, with the training being based on a set of training examples. For example, decision tree classifiers generally seek to determine whether or not an input work is in a given category by examining information about other categories which apply to the same song. The known algorithms for building decision trees are adapted to build robust, compact and precise decision trees and often include techniques aimed at identifying a hierarchy amongst the "non-categorical" attributes that will be used in the decision tree (i.e. certain "non-categorical" attributes may be more informative than others and will tend to be place at nodes closer to the root of the decision tree; others will not help to determine whether or not the input audiovisual work is in the target category and so will not be used at any node of the decision tree—i.e. the decision tree will be pruned so as to consider only those attributes which are useful).

As an example of a trained classifier, consider the decision tree shown in FIG. 1. This decision tree seeks to predict whether, for a song S, "variant natural/acoustic" is true. In other words, this decision tree seeks to predict whether an input song S has an attribute named "variant natural/acoustic". The decision-making process begins at the "root" (labelled A) in the top left-hand corner of FIG. 1 and, depending on the decision made at each node, ends at a respective "leaf" designating whether or not the song has the attribute "variant natural/acoustic". There are numbers q/r shown in brackets at each leaf: q indicates the number of songs in the training database for which the prediction made at this leaf is correct and r indicates the number for which the prediction is incorrect.

However, in order for the decision tree of FIG. 1 to determine whether or not song S is in the category "variant natural/acoustic" it is necessary to know whether or not song S possesses 14 other attributes, notably attributes named "Variant Aggressive", "Era 1950-1960", "Genre Singer/Songwriter", "Situation Action/Fast Cuts/Hectic", "Style Rock", "Musical Setup Folk Band", "Style Jazz", "Genre Live Classic", "Main Instrument Guitar (Distortion)", "Situation Fight", "Style Soul", "Era 1960-1970", "Variant Live", "Era 1980-1990". Thus, the decision tree does not help to generate tags for an untagged music file representing a musical work.

The difficulties of automatically-tagging an audiovisual work have been discussed above in terms of audiovisual works described using Boolean tags, i.e. tags which indicate that "attribute X is true", "attribute Y is false", etc for a given work. However, tags are not always Boolean, other types of tag exist: for example, some may relate to attributes which can take values selected from within a set. For these other tags too, it is difficult to find a method or system which can automatically assign values.

The present invention has been made in the light of the above-described problems.

The present invention provides a method of automatic tagging of audiovisual files as defined in the appended claims.

The present invention further provides an audiovisual-file-tagging system as defined in the appended claims.

The present invention yet further provides a computer program as defined in the appended claims.

The method and system for tagging audiovisual files provided by the present invention are more precise than known methods and systems using signal-processing based techniques and enable tags to be generated for attributes which not normally covered by signal-based meta-data extraction techniques (e.g. cultural tags such as subjective emotions, associated personal memories, editorial information—e.g. lyrics, language, recording date, etc.). Moreover, the present invention makes data-mining techniques applicable to the automatic extraction of meta-data for new works, by boot-strapping the system with an initial estimate of meta-data. In addition, the present invention is independent of the particular taxonomy that is applicable to the meta-data (tags) and so is well-suited for use by different communities of users having different tags and different definitions for those tags.

The present invention can be used to provide a fully-automatic method and system for tagging audiovisual files, according to a hybrid approach allying aspects of signal processing and aspects of machine learning. In this fully-automatic method and system, a signal-processing approach is used to produce the initial estimate of the attributes of an audiovisual work (for example, attributes which are well-correlated with the features of a signal corresponding to the work) and then this initial estimate is supplied to a machine learning module which produces an updated estimate of the attributes (for example, including "more difficult" attributes such as "cultural" attributes). The machine learning module typically infers values of attributes for the audiovisual work by assuming that there will be the same correlation between the various attributes of the initial estimate and other attributes of the audiovisual work as there is between corresponding attributes possessed by audiovisual works of the same kind (music, text, image, video, etc.) in a training database which has been manually tagged.

For a music file, this fully-automatic tagging method and system may use timbre-based inference to produce the initial estimate of tags. For example, the timbre of the musical work corresponding to an input music file can be determined and used as a basis for inferring that the music file will have tags comparable to those of musical works in a training database which have comparable timbre. As another example, for an image file, the colour and texture of the image can be determined and used as a basis for inferring that the image file will have tags comparable to those of image files in a training database which have comparable colour and texture.

The machine learning module may use a classifier, e.g. a neural network, decision tree, etc., that has been trained using data relating to the manually-tagged training database.

The present invention can also be used to provide a semi-automatic method and system for tagging audiovisual files, in which a user is prompted to manually input the initial tag data.

The above, and other, features and advantages of the present invention will become clearer from the following description of various embodiments thereof, given by way of example, and the accompanying drawings, in which.

Figure 1:
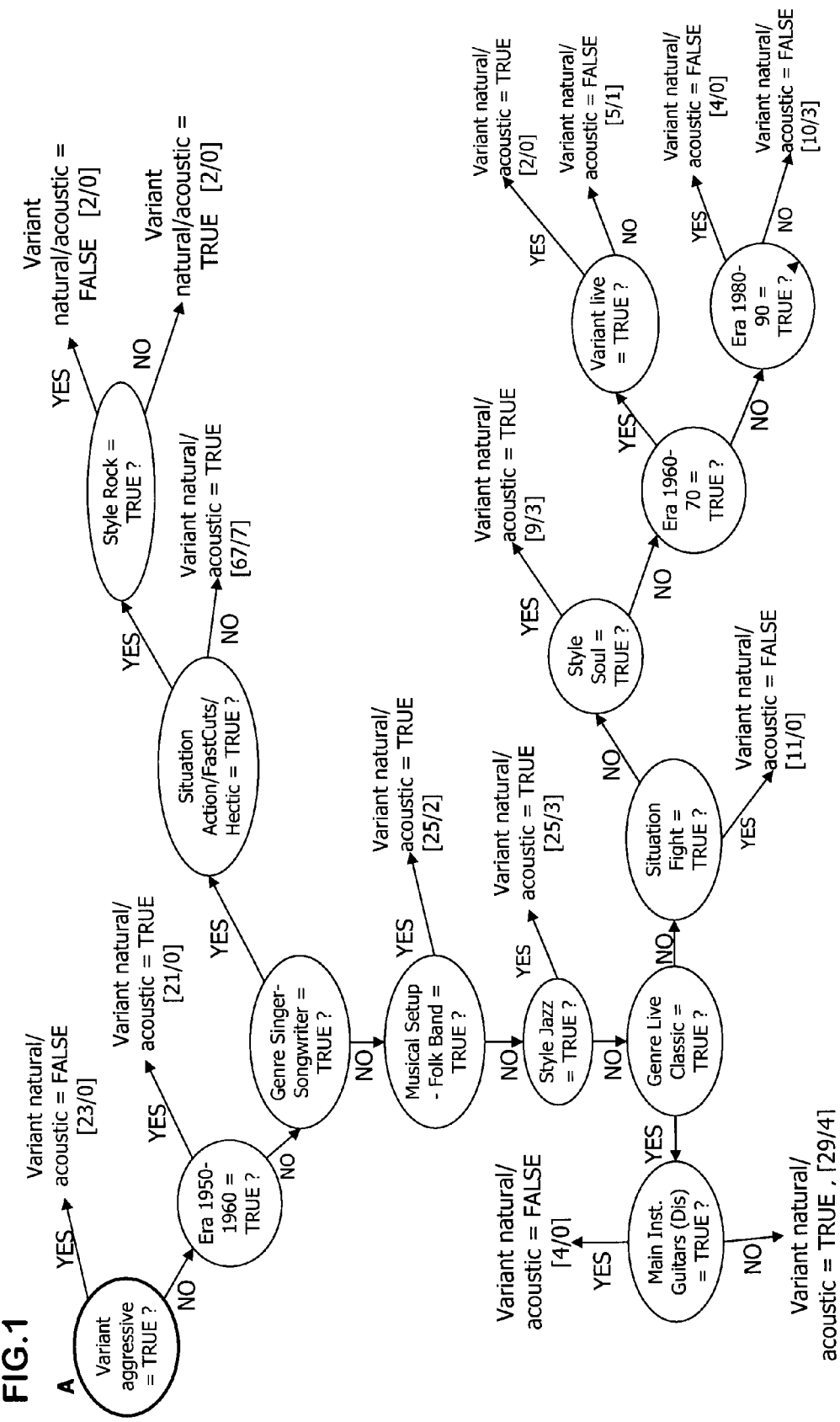
FIG. 1 illustrates an example of a decision tree adapted to determine whether a musical work is in the category "natural/acoustic"

In the description that follows it is to be understood that the expression "song" may be used in a general way to indicate any musical work, whether or not that work includes vocals. Further, the expression "image" may be used for a still image (such as a photograph) as well as for a frame of a video.

Furthermore, the expression "tag" is generally used as short-hand for a duple consisting of a data item identifying a particular attribute and a data item indicating the value of the identified attribute. However, this will not always be the case.

In some systems, it is desired that all of the audiovisual files in a content collection should possess tags for a predefined set of attributes. In such a case, it can be sufficient for each audiovisual file to have tag data consisting of an ordered list of attribute values, without a formal identification of the attributes themselves (the attribute associated with a particular value in the list can be deduced from the position of that value within the list).

In some systems, some or all of the attributes that are of interest to a user are Boolean attributes which can only take values "true" or "false", e.g. an attribute "Genre western" for a video. The tag for such an attribute could indicate both an attribute identifier "Genre Western" as well an associated value "true". However, it may be more efficient to limit the tag data to a simple indication of the Boolean attribute "Genre Western" itself and only assign this tag to a particular audiovisual work if the attribute in question is "true" for this work. For example, if the attribute-values ["English language"="true"; "non-fiction"="true"; "subject science"="false"; "text type article"="true"; "linguistic register slang"="false"] hold for a text work V, the tag data displayed to a user in respect of work V could indicate merely that this work is a non-fiction article written in English. In other words, for simplicity of interpretation, it can be decided that no data will be displayed to the user in respect of the attributes having value "false". If desired, this "omitted" data relating to the non-applicable attributes can still be generated and stored for the audiovisual work in question.

The present invention is not limited with regard to the taxonomy used for defining attributes and their domains. So, for example, if it is desired to describe the main colour in an image file, one system designer might define a set of Boolean attributes "colour green" "colour blue" "colour red", etc. to cover all of the different possibilities he envisages, whereas a second designer might define a single "multi-valued" attribute "main colour" and a set of possible values {"blue", "red", "green", . . . } for this attribute. In the first case the number of attributes increases, but there are only two possible values, whereas in the second case the number of attributes is limited but the number of possible values increases. The present invention is applicable regardless of the taxonomy that is chosen.

The present invention exploits the correlations that are known to exist between the various attributes of audiovisual works. More particularly, the present invention assumes that the correlations that exist between the attributes of a set of training examples (which have already been tagged manually) are liable to exist also between the attributes of other audiovisual works of the same kind, notably audiovisual works whose files are currently untagged but require tagging. The file-tagging method according to the present invention involves provision of an initial estimate of the tags for an audiovisual file and then use of the above assumption to convert that initial estimate into a revised estimate that is likely to be fuller and/or more accurate.

For example, application of a tagging method according to the invention to a particular music file might involve the following initial estimate of a music file's tags: ["strong electric guitar" and "heavy metal"]. If analysis of a set of manually-tagged training examples shows that most songs which have the attribute "heavy metal" also have the attribute "violent lyrics", then, according to the method of the present invention, the initial estimate of this music file's tags could be expanded to ["strong electric guitar", "heavy metal" and "violent lyrics"] with a reasonable probability of accuracy.

Most implementations of the present invention will expand the initial tag estimate for an audiovisual work of a particular kind by inference based on correlations observed between the values of attributes of works of the same kind (e.g. when tagging a video clip, the inference will be based on attribute-value correlations observed in video clips of the training database, and not on correlations observed for still images, texts, etc). In theory, the present invention could make use of correlations observed for audiovisual files of different types—e.g. if, for music files, a correlation is observed between possession of an attribute "character=strong" and possession of an attribute "mood=powerful" perhaps a corresponding inference could be made for video clips. However, in practice, the kinds of attributes that are liable to show a correlation applicable across different kinds of audiovisual work tend to be very general, and are not particularly useful.

Figure 2:
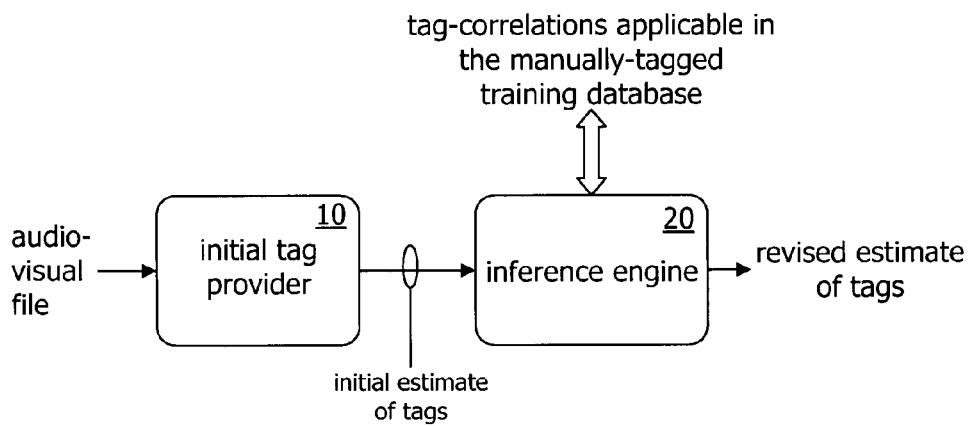
FIG. 2 is a diagram schematically representing the main components of a tagging system according to the present invention.

FIG. 2 is a diagram indicating the main components of file-tagging systems according to the present invention. A first element of the system, an "initial tag" provider 10, is adapted to provide an initial estimate of the tags for an input audiovisual file. The initial estimate will generally include estimated values applicable to a number of attributes: in the case of Boolean attributes this will be an estimate of whether the attribute is "true" or "false" for the input audiovisual work; in the case of attributes having a domain containing a set of discrete values, this will generally be an estimate of which value in the set applies to the input work; and in the case of numerical attributes this will generally be an estimate of the numerical value for this attribute of the input work.

The initial estimate is fed to a second component of the system, designated inference engine 20 in FIG. 2. Based on the initial estimate of the music file's tags, the inference engine 20 produces a revised estimate of the music file's tags. More particularly, the inference engine 20 infers more precise values for the tags (and/or values for an expanded number of tags) by assuming that the same correlations exist between the tags of the input file as exist between the tags of files of the same kind (music, or text, or video, etc.) in a training database. The inference engine 20 infers more precise values for the tags by applying correlation functions to the tags (estimated attribute-values) of the initial estimate, these correlation functions being derived from analysis of the examples in the training database.

The tag-correlations used by the inference engine 20 may have been learned beforehand, for example during a "training phase" in which the correlations between the tags of audiovisual files in the training database are explored. This "exploration" will generally involve use of known data mining techniques, for example the training of a classifier such as a neural network, decision tree, etc. Alternatively, these correlations may be explored at the time when an untagged audiovisual file is input. In the latter case, the system may limit itself to exploring correlations which involve tags for which values are included in the "initial estimate". In other words, if the initial tag estimate for a music file indicates that the file has the set of attributes ["warm mood", "female singer" and "slow tempo"], the inference engine 20 can save time and processing power by investigating only those tag-correlations in the training database which relate to music files and involve one or more of the attribute-value pairs "warm mood=true", "female singer=true" and "slow tempo=true" (and, generally, will explore all the correlations involving these values of these three attributes so as to exploit the available information to the maximum).

The inference engine 20 can apply correlation functions to the attribute-value estimates in the initial estimate in a variety of ways, depending on the nature of the machine-learning algorithm applied to analyse the correlations that hold for the attribute-values of the training examples. For example, if the correlations applicable to the training examples are used to train a set of classifiers (e.g. a set of decision trees, neural networks, etc.), then the inference engine 20 can apply correlation functions to the attribute-values of the initial estimate by supplying these attribute-values to the set of trained classifiers.

The training database relates to a collection of audiovisual files which have already had tags assigned to them manually. For each training example, the training database will include at least the tag data that has been manually assigned to this training example and some identifier of the associated audiovisual file; this identifier will generally be the title of the work represented by the file or some code assigned to the audiovisual work/file (which, at the limit, could merely be some arbitrary code indicating "music file no. 1", "video file no. 23", etc.). Where storage space is available, it can be advantageous to store the audiovisual files themselves as well as their manually-assigned tags/identifiers. This enables processing to be performed to determine physical features of the audiovisual signal. Alternatively, in cases where it is desired to perform processing relating to the physical features of the audiovisual signals, it may be sufficient for the training database to include some indication of the physical features—in such a case the training database might include the following data for a music-file training example: <music file identifier>, <value of acoustic parameter 1>, <value of acoustic parameter 2>, <tag for attribute 1>, <tag for attribute 2>, ... <tag for last attribute>; or, for a video-file training example: <video file identifier>, <value of spatio-temporal image parameter 1>, <value of spatio-temporal image parameter 2>, <tag for attribute 1>, <tag for attribute 2>, ... <tag for last attribute>; etc.

In a case where the correlations between the tags (attribute-values) of the training examples have already been explored during a training phase performed before the system is put into use for tagging untagged audiovisual files, it is not then essential for the inference engine 20 to have access to the training database during the subsequent tagging phase. In this case, during the tagging phase it is sufficient for the inference engine 20 to have access to data defining the correlations between the training examples.

In a case where the correlations between the tags of the files of the training database are explored during tagging of an untagged audiovisual file, the inference engine 20 requires access to the training database (or to some intermediate entity which can itself dynamically explore the correlations of interest between the tags of the training examples relating to works of the input kind and report back to the inference engine 20). Thus, systems embodying this kind of approach may well hold the training database in a memory housed in the same apparatus as the inference engine 20. However, this is not essential. The training database (and/or a memory/register holding details of the correlations derived from the training database) may be separate from the apparatus housing the inference engine 20 but accessible to it, for example it could be recorded on a recording medium readable by a reader that communicates with the inference engine 20, or held in a remote storage device accessible over a network connection (such a local-area network or wide-area network).

It is likely that audiovisual-file tagging systems according to the present invention will be implemented as a software application or module loaded on a general-purpose computer system, and that this audiovisual-file tagging application/module will interact with other applications or modules. For example,—an audiovisual-file tagging system 100 is likely to be used by a service provider who is building up a collection of content available as files for download to remote computers, mobile phones, etc. In such a case, the tagging system/application is likely to be associated with a database management application. Audiovisual-file tagging systems according to the invention may also be used by individuals who have or are building up a collection of audiovisual files. In such a case the audiovisual-file tagging system is likely to be implemented as a software application/module associated with a browsing application/module.

Although the present invention can provide a "universal" tagging system suitable for tagging audiovisual works of all the different kinds (or a combination of two or more different kinds), it is more likely that separate systems will be built each designed for tagging a respective different kind of audiovisual file, e.g. just for tagging music files, just for tagging video files, etc. (because most commercial content-download services and content-browsers relate to a respective single kind of audiovisual work).

Figure 3:
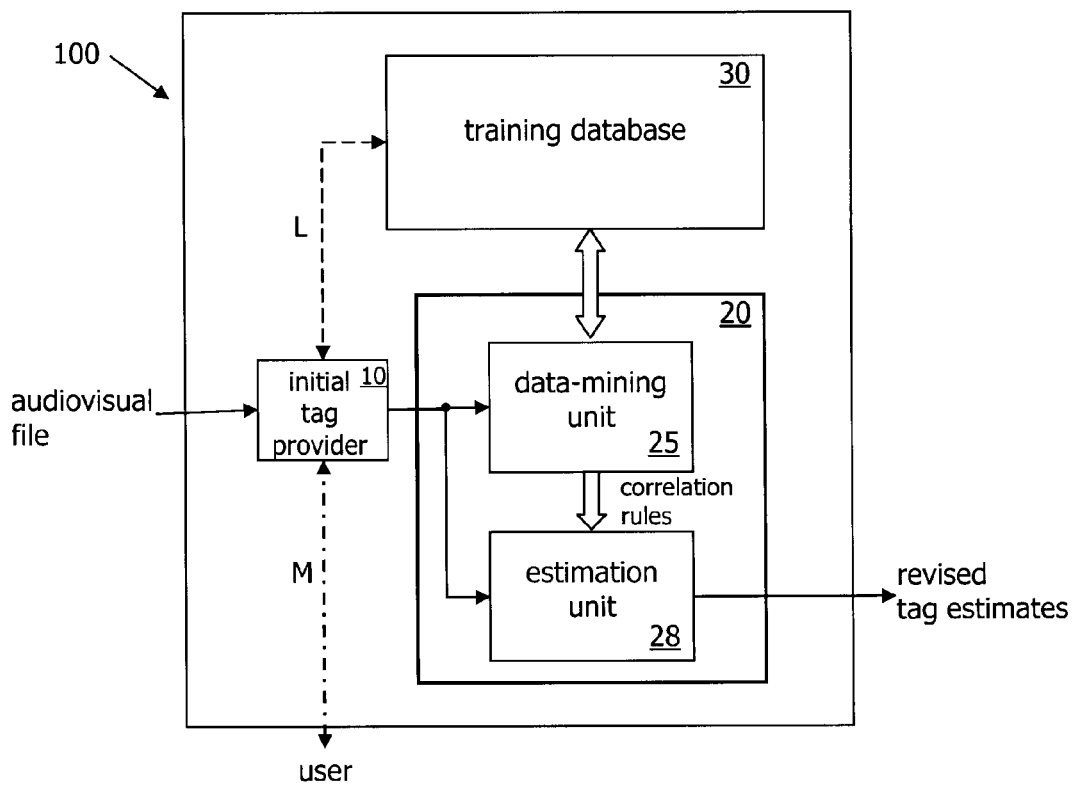
FIG. 3 is a block diagram illustrating the main components of a tagging system according to a first embodiment of the present invention.

FIG. 3 illustrates the main components of an audiovisual-file tagging system 100 according to a first embodiment of the present invention. In this first embodiment, at the time when an untagged audiovisual file of a particular kind (music, image, video) is input to the tagging system 100 the inference engine 20 explores the correlations that exist between tags of a training database 30 which stores data relating to a set of manually-tagged music files of the same kind. Thus, the inference engine 20 includes a data-mining unit 25 adapted to explore the correlations between tags of the training database 30, and an estimation unit 28 which calculates values for the tags of the music file based on the initial estimate provided by the initial tag provider 10, and the correlation rules determined by the data-mining unit 25.

A wide variety of different machine learning/data-mining techniques are known. The present invention is not limited with regard to which machine learning/data-mining technique is used for determining the correlations that exist between the tags of the training database examples. However, the calculations performed by the estimation unit 28 will be adapted to suit the data-mining technique used by the data-mining unit 25.

For example, the data-mining unit 25 may use the back-propagation algorithm to train a set of neural networks each adapted to predict the value of a respective different tag. The data-mining unit 25 will present training data from the training database to the neural networks so that, at the end of the training, the weights of the various neurons have been set to the values which, for the training examples, produce the best estimate of the "categorical" tag based on values of "non-categorical" tags. According to this example, the estimation unit 28 can be adapted to apply, as an input to the neural networks trained by the data-mining unit 25, the initial tag estimate produced by the initial-tag provider 10.

Similarly, if the data-mining unit 25 is adapted to build decision trees based on the data in the training database, then the estimation unit 28 can be adapted to use the initial tag data provided by the initial-tag provider 10 to make predictions using the decision trees built by the data-mining unit 25.

In the case where the correlations between tags of the training examples have been investigated during a preliminary training phase, such that there is no data-mining unit in the tagging apparatus 100, the estimation unit 28 is adapted to perform calculations suited to the type of data-mining/machine learning that was used during the training phase.

In some cases it may be possible to quantify the certainty of the tag estimates, using a confidence measure or precision, p. For example, the confidence measure p could take values varying from 0%, meaning complete uncertainty, to 100% meaning that it is considered to be absolutely certain that the music file has the attribute represented by this tag. There are a variety of different ways in which the value of this confidence measure could be set and, in general, it will depend on the technique that was used for producing the tag estimate. Some examples appear in the description below.

In cases where a confidence measure is assigned to tag estimates it is possible to define certain tags as "well-estimated" and others as being fairly uncertain, by referring to the value of the confidence measure p associated with the respective estimates. For example, a threshold level $\theta$ can be defined for the confidence measure p, and it can be judged that those tags for which $p > \theta$ are "well-estimated". The system 100 may be designed so that the calculation of the revised tag estimate is based only on the "well-estimated" tags from the initial tag estimate, ignoring the values of other tags included in the initial tag estimate.

Figure 4:
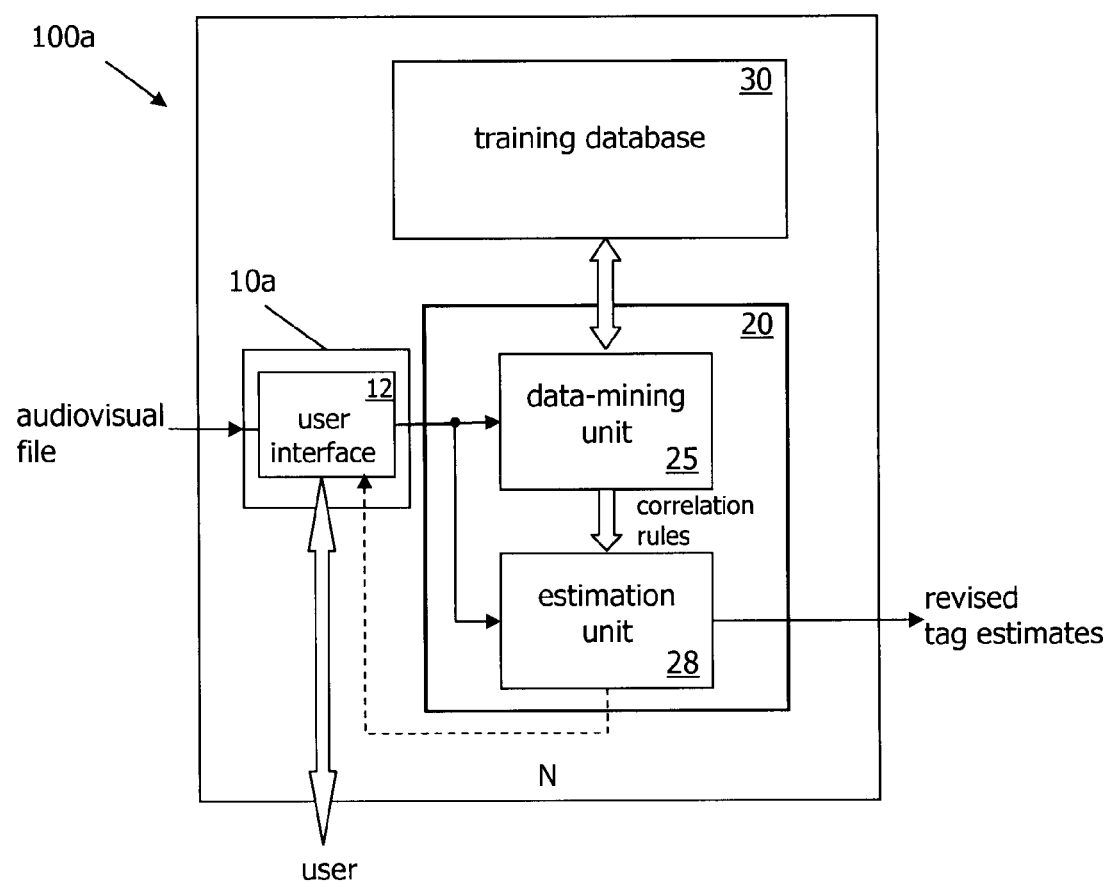
FIG. 4 is a block diagram illustrating a semi-automatic variant of the first embodiment.
Figure 5:
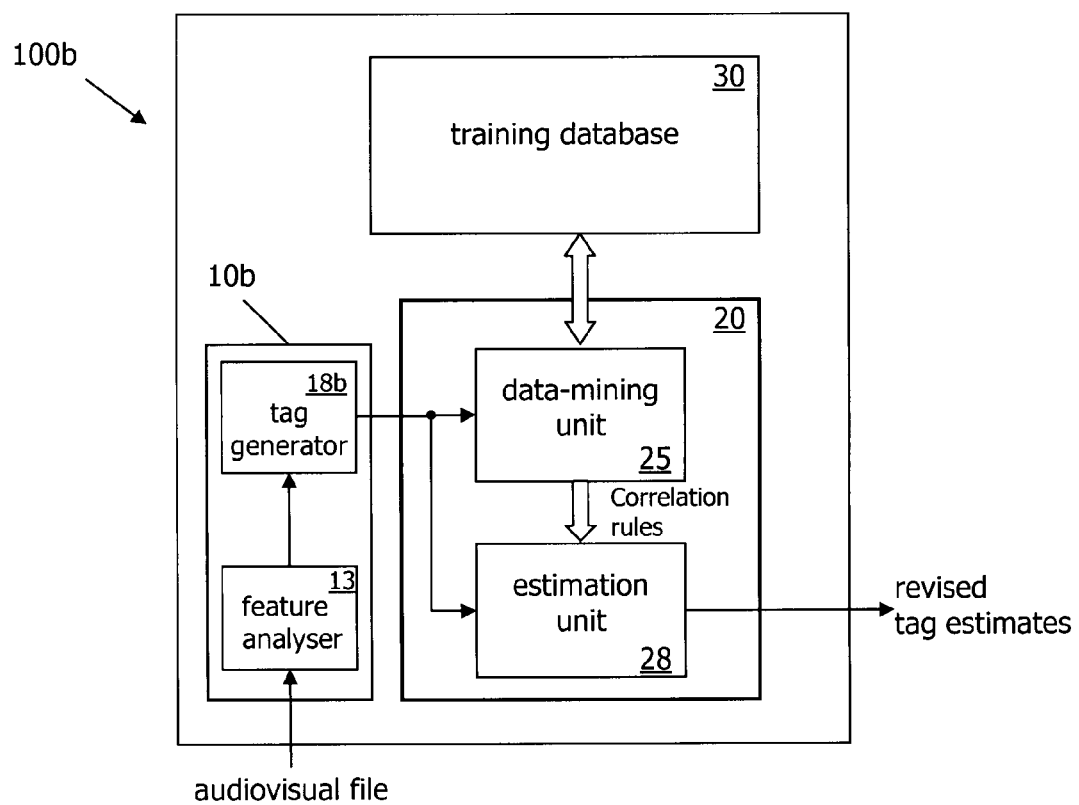
FIG. 5 is a block diagram illustrating a first fully-automatic variant of the first embodiment.
Figure 6:
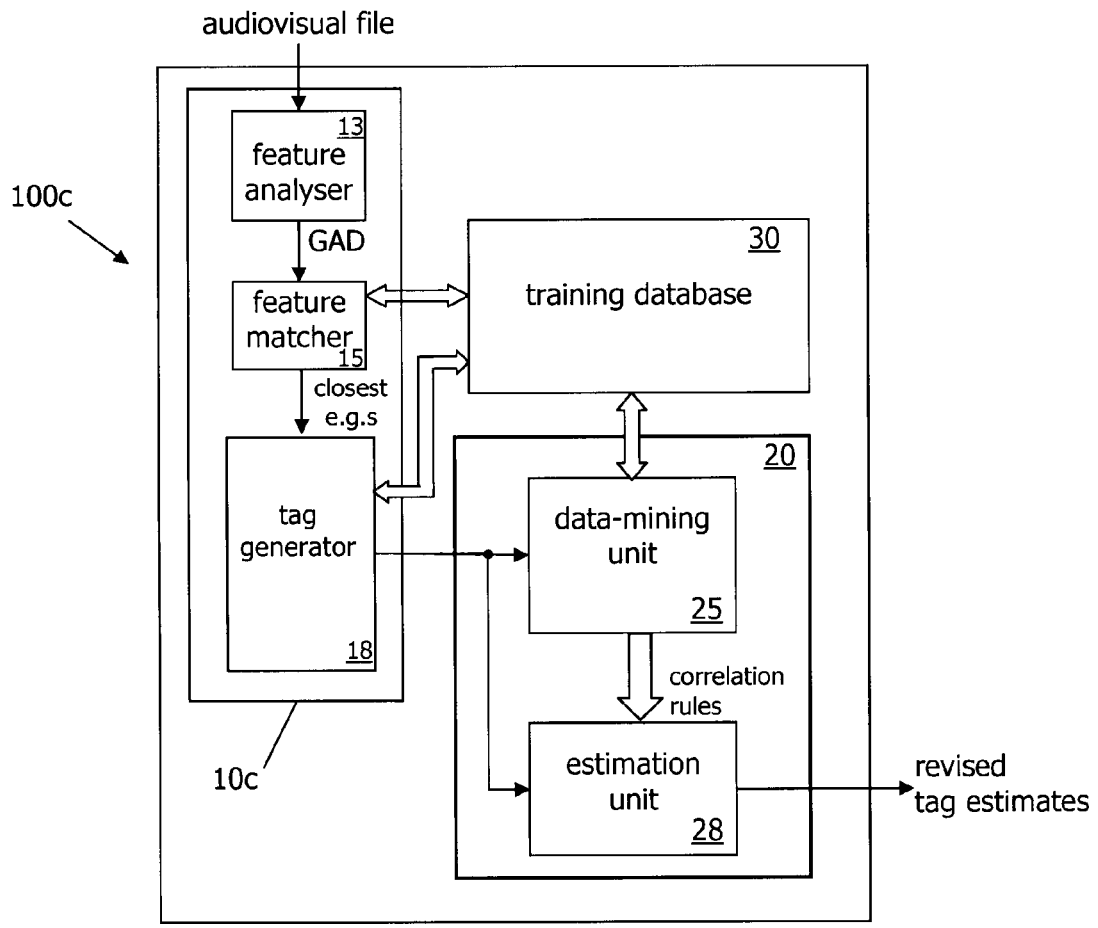
FIG. 6 is a block diagram illustrating a second fully-automatic variant of the first embodiment.

There are a number of different ways in which the initial estimate of the audiovisual file's tags can be produced and, in some cases, this may involve communication between the initial tag provider 10 and the training database and/or a user (as indicated by the dotted lines labelled L and M in FIG. 3). Three different techniques, which are not exhaustive, for generating the initial tag estimate will now be described with reference to FIGS. 4 to 6. The block diagrams of FIGS. 4 to 6 are based on the overall system architecture illustrated in FIG. 3, for simplicity. However, the skilled person will readily understand that the different implementations of the initial-tag provider 10 illustrated in FIGS. 4 to 6 can be used in systems having a different basic architecture (e.g. in which the training database is not present in a unitary apparatus with the inference engine, in which the inference engine is constituted by modules different from those shown in FIG. 3, etc.).

Turning now to FIG. 4, this illustrates a semi-automatic system for tagging audiovisual files. According to this semi-automatic system, a user inputs certain of the tags for an audiovisual file but the tags are completed or refined automatically. In the variant illustrated in FIG. 4, the initial tag provider 10a comprises a user interface 12 adapted to prompt the user to input tags for an audiovisual file.

Typically, the user interface 12 is a module programmed to perform the prompting by causing a tag-input request to be displayed on a suitable display device (e.g. a computer monitor, a mobile phone display screen, etc.). The user interface 12 may be adapted to prompt the user for tag input at different times. For example, the prompt may be given: at any time when the user accesses an audiovisual file whose tags are missing or incomplete (e.g. when the user accesses the file within a browser application associated with the audiovisual-file tagging system); at times when the user acquires new content, e.g. by downloading an audiovisual file from a server, uploading from a recording medium (an audio CD, a DVD, etc.) or from a recording device (e.g. a digital camera, digital camcorder, etc.) or from a reader device (e.g. a scanner, perhaps associated with optical character recognition software); at times when the user indicates a desire for tagging to be performed, etc.

The user interface 12 may be adapted to indicate to the user which kind of tags should be input (e.g. by displaying a message or a query such as "input the genre of this music", "is this a fight scene?", "fiction or non-fiction?", etc.). Alternatively, the user interface 12 may leave the user free to input any tags which he/she considers to be applicable to the content in question.

When the user responds to the tag-input prompt, the user interface 12 converts the user input into tag data representing an initial estimate of the tags for the audiovisual file in question. This initial estimate data is then fed to the inference engine 20 so that a revised estimate of the input file's tags can be produced (as discussed above).

The above-described semi-automatic system 100a may be implemented as an interactive system that calculates the revised tags in an iterative process. In an interactive system of this type, once the inference engine 20 has calculated a revised tag estimate it may feed the revised tag estimate back to the user interface 12 in the initial tag provider 10a (as indicated by the dashed line labelled N in FIG. 4), so that the revised tag estimate can be presented to the user for ratification or correction. If the user corrects the revised tag estimate then the initial tag provider 10a can supply the corrected estimate to the inference engine 20, for a new calculation of further-revised tags. This iterative process can be repeated as desired, for example until such time as the user ratifies the revised (or further-revised) tag estimates. Alternatively, the number of repetitions may be restricted so as to limit the number of inputs required from the user.

For instance, if the user inputs tags "Country=France" and "Genre=Classical" for a music file W, the initial-tag provider 10 will supply data indicative of these tags to the inference engine 20 as the initial tag estimate. The data-mining unit 25 may analyse music files in the training database and find that files which have the tags "Country=France" and "Genre=Classical" also tend to have the tags "Language=French", "Instrument=Orchestra" and "Epoch=$19^{th}$ Century". The data-mining unit 25 will supply correlation data representative of these correlations to the estimation unit 28 and the estimation unit will produce a revised tag estimate ["Country=France", "Genre=Classical", "Language=French", "Instrument=Orchestra" and "Epoch=$19^{th}$ Century"]. If this revised tag estimate is presented to the user, the user may indicate that, in fact, the tag "Epoch=$19^{th}$ Century" does not apply to music file W because music file W relates to a musical work from the $20^{th}$ century. The corrected tag estimate data ["Country=France", "Genre=Classical", "Language=French", "Instrument=Orchestra" and "Epoch=$20^{th}$ Century"] is supplied to the inference engine 20. If many of the music files in the training database are piano pieces by Ravel or Debussy, the data-mining unit 25 may now find that files in the training database which have the tags "Country=France", "Genre=Classical" and "Epoch=$20^{th}$ Century" also tend to have the tag "Instrument=Piano". Data representative of this correlation (as well as others found by the data mining unit 25) is fed to the estimation unit, and may lead to output of a further-revised tag estimate ["Country=France", "Genre=Classical", "Language=French", "Instrument=Piano" and "Epoch=$20^{th}$ Century"].

It will be seen from the above example that the tag estimates produced by the estimation unit 28 may not always be correct. If an iterative process is used to produce the final estimate of the input file's tags, then some tag estimates produced early on in the process may be changed later on. However, it would not be appropriate to change the tags that have been manually assigned by the user. In some embodiments of this semi-automatic system, a confidence measure, such as the above-mentioned confidence measure p, can be assigned to the tag estimates input to the inference engine 20.

In such embodiments it may be appropriate to assign a confidence measure p=100% to tags provided by the user, with a view to ensuring that those tags are not changed.

FIGS. 5 and 6 relate to fully-automatic systems for generating high-level meta-data for audiovisual files. These fully-automatic systems use a signal-based approach to generate the initial tag estimate. Thus it will be seen that these fully-automatic systems are a hybrid combining the signal-based approach and the machine learning approach.

FIG. 5 illustrates the overall architecture of a fully-automatic system 100b according to a first variant in which the initial-tag provider 10b is adapted to calculate the initial tag estimate based on the physical features of the audiovisual work whose file is being tagged. More particularly, the initial-tag provider 10b includes a feature analyser 13 which analyses the features of the signal corresponding to the input audiovisual file and outputs a signal indicative of a set of one or more evaluated feature-value pairs. A tag generator 18b then calculates the initial tag estimate based on the evaluated features and associated values, and outputs this initial estimate to the inference engine 20.

As mentioned above, there is a reasonably good correlation between certain acoustic properties which describe the global acoustic properties of a musical work, and some genre categories or moods. If the system of FIG. 5 is applied for music-file tagging, the tag generator 18b may store details of these correlations and use them to generate the initial tag estimate. For example, the acoustic analyser 13 may be adapted to analyse the timbre of the acoustic signal representing an input music file and the tag generator 18b may then access a look-up table which stores different tag estimates for respective different timbres.

The skilled person will readily understand that acoustic properties other than, or in addition to, timbre can be used, in music-tagging embodiments of the present invention, to characterise the global acoustic properties of a musical work. For example, a harmonic analysis could be performed on the musical work in order to produce a set of parameters describing the harmonic properties of the musical work (e.g. relating to the number and degree of different chords and intervals present in the music). This kind of harmonic analysis can be automated to reasonable prevision—see "Melody Description and Extraction in the Context of Music Content Processing" by Gomez et al, Journal of New Music research, 2003, 32(1). Parameters of this kind could be used to infer various attributes: for example, if the chords are simple and few, it might be inferred that the musical work has "Genre=rock", if there are a lot of 7ths and 9ths, it might be inferred that the attribute "Genre=jazz" applies, if there are a lot of minor chords an attribute "mood=sad" could be assigned.

A large number of different physical properties can be used to characterise audiovisual signals of different kinds: for example, music can be characterised by its timbre, harmonics, rhythm, etc; still images can be characterised by their colour, texture, etc; moving images can be characterised by properties similar to those of still images as well as by other properties (e.g. optical flow), etc. related to the change in the image from frame-to-frame; text is often described in term of the frequency (or probability) of occurrence of words; and vocal works are often characterised by prosodic cues such as pitch and phoneme rate. The skilled person will be well aware (e.g. from the huge body of literature that exists relating to music information retrieval (MIR), content-based image retrieval (CBIR), text categorization, etc.) of the numerous techniques that are suitable for extracting information on these properties from signals representing these different kinds of audiovisual work, so more detail is not provided here.

FIG. 6 illustrates the overall architecture of a fully-automatic system 100c according to a second variant in which the initial-tag provider 10c is adapted to calculate the initial tag estimate by considering what are the tags of the audiovisual files in the training database of the same kind as the input work and that have globally "similar" signals to that of the input audiovisual file.

More particularly, the audiovisual-file tagging system 100c of FIG. 6 has an initial-tag provider 10c which includes a feature analyser 13, for determining a set of one or more feature-value pairs describing the physical properties of the signal corresponding to the input audiovisual file. As illustrated in FIG. 6, this set of feature-value pairs is a set of descriptors, GAD, describing the global properties of the audiovisual signal. The initial-tag provider 10c also includes a feature matcher 15 which determines which of the training examples in the training database 30 has a signal (acoustic signal, pixel pattern, spatio-temporal pixel pattern) that is "similar" to the signal for the input audiovisual file. The feature matcher 15 may identify a set of "nearest neighbours" (in terms of global signal properties) to the input file. A tag generator 18 in the initial-tag provider 10c then examines what are the tags of these "similar" training examples and infers that the input file will possess the same tag values.

As the skilled person is well aware, the global similarity between two audiovisual signals can be evaluated in a variety of different ways, with the applicable techniques varying depending on the type of audiovisual work in question and the particular signal property (or properties) chosen for characterising the work. To cite just some examples: in the field of content-based image retrieval, different image-processing algorithms exist for determining which images in a collection are the "nearest-neighbours" of a given input image; videos can be compared by considering the mean colour histogram over all frames; texts can be compared based on probabilities of occurrence of words; works recording speech can be compared using the same techniques as are used for music; etc. The skilled person will understand that these listed examples are by way of illustration only: the invention is not particularly limited with regard to the signal property (properties) or processing technique used for determining the "similarity" of two audiovisual works.

The global acoustic similarity between two pieces of music/songs can be evaluated in many different ways. However, the following technique is considered to be particularly suitable for determining a quantitative measure indicative of the timbre of a musical work (see FIG. 7A) for use in comparing the acoustic "similarity" of different musical works (see FIG. 7B). This technique is described more fully in the paper "Improving timbre similarity: How high's the sky?" by J-J. Aucouturier and F. Pachet, Journal of Negative Results in Speech and Audio Sciences, 1(1), 2004.

Figure 7A:
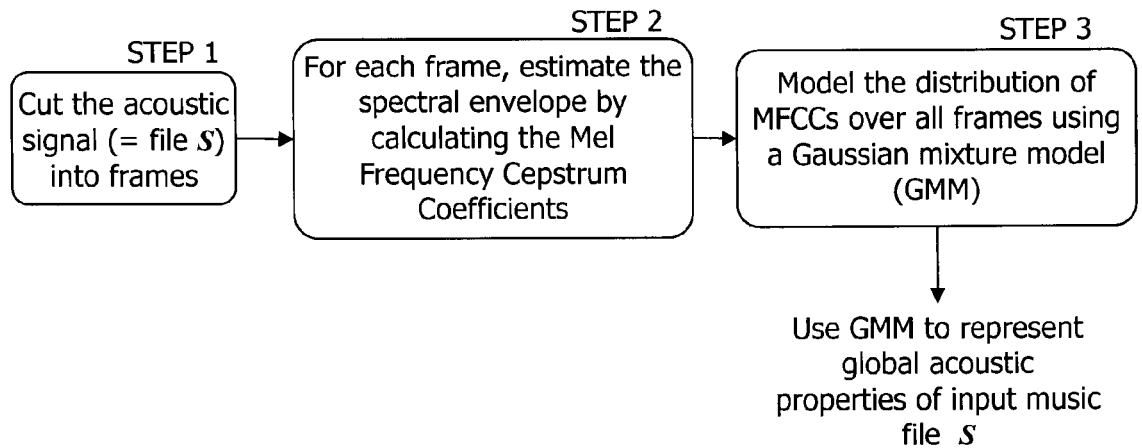
FIG. 7A illustrates a method of generating a measure of the acoustic properties of the acoustic signal representing the input music file.

As indicated in FIG. 7A (step 1), an acoustic signal representing the music file is first cut into segments called frames. (The input music file may be input in the form of this acoustic signal or, more usually, the input music file can be decoded into the required acoustic signal by standard decoding techniques associated with the file format: .wav file, .mp3 file, etc). For each frame the global spectral envelope is estimated by computing a set of Mel Frequency Cepstrum Coefficients (MFCCs)—step 2. The distribution of MFCCs over all the frames is then modelled using a Gaussian Mixture Model (GMM) which estimates a probability density as a weighted sum of M simpler Gaussian densities (called "components" or "states" of the mixture)—step 3.

The GMM for a song S can be considered to be a quantitative measure of the timbre of song S and it can be represented by $p_S(x_t)$, where $x_t$ is the feature vector (MFCC values) observed at time t. $p_S(x_t)$ can be calculated, as follows:

$$p(x_t) = \sum_{m=1}^{m=M} \pi_m N\left(x_t, \mu_m, \sum_m\right) \quad (1)$$

where N is a Gaussian probability density function having mean $\mu_m$ and covariance matrix $\Sigma_m$, and $\pi_m$ is a mixture coefficient (also called state prior probability). The mixture coefficients ($\pi_m$ for all m), the means ($\mu_m$ for all m) and the covariances ($\Sigma_m$ for all m) are learned, from the set of MFCC vectors of the song, using the conventional E-M algorithm (estimation-maximization algorithm).

The timbre measure described above (which models the acoustic signal using a GMM) can be used to determine whether two musical works are "close" to each other, acoustically. In other words, when the system 100c of FIG. 6 is implemented as a music-file tagging system, the feature analyser 13 may be an acoustic analyser adapted to generate a GMM for the input music file and output this, as a global acoustic descriptor (GAD), to an acoustic matcher 15. The acoustic matcher 15 can then determine which music files in the training database 30 have GMMs that are "close" to that of the input song.

In the above case, the acoustic matcher 15 may first obtain data on the GMMs for the training examples in the training database 30 (see FIG. 7A, step 1). The acoustic matcher 15 may itself analyse the acoustic properties of the training examples in the training database, so as to determine GMMs for the corresponding acoustic signals. However, other approaches are possible. For example, data may be stored in the training database indicating the GMMs for the acoustic signals representing the different music files in the training database.

The "closeness" of two GMMs $p_A(x)$ and $p_B(x)$ (as defined above) can be evaluated using a Monte Carlo approximation of the Kullback-Leibler (KL) distance between each duple of models $p_A(x)$ and $p_B(x)$.

The KL-distance between 2 GMM probability distributions $p_A(x)$ and $p_B(x)$ is defined by:

$$d(A, B) = \int p_A(x) \log \frac{p_B(x)}{p_A(x)} dx \quad (2)$$

The KL distance can thus be approximated by the empirical mean $$\tilde{d}(AB) = \frac{1}{n} \sum_{i=1}^{n} \log \frac{p_B(x_i)}{p_A(x_i)} \quad (3)$$

(where n is the number of samples $x_i$ drawn according to $p_A$) by virtue of the central limit theorem.

Figure 7B:
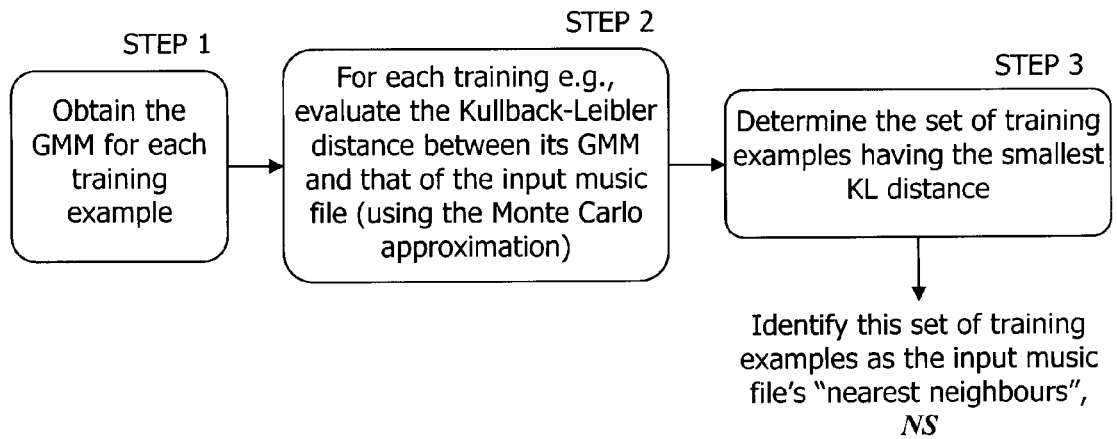
FIG. 7B illustrates a method of using the measure generated in FIG. 7A for identifying acoustic "nearest neighbours" of the input music file.

The acoustic matcher 15 evaluates the KL distance between the GMMs for the various training examples and the GMM for the input music file (FIG. 7B, step 2). Then the acoustic matcher 15 identifies a number of "nearest neighbours" $N_S$ to the input piece of music (FIG. 7B, step 3), for example the ten examples in the training database for which the above-described KL-distance between themselves and the input piece of music (as modeled using GMMs) is the minimum.

It may not be appropriate to assume that all of the tags of the input music file will be the same as those of the "similar" training examples in the training database. However, it may be reasonable to assume that attribute-values which have been found to be correlated with the physical features of the audio-visual signal representing a work are liable to be the same (or to take similar values) in the input file and in the "similar" training examples.

Thus, the tag generator may be designed to limit the tags included in the initial tag estimate so as to include only those tags of the "similar" training examples which relate to attributes that can be predicted, from physical signal-properties, with little ambiguity, such as (but not limited to): broad genre classes (classical, rock, etc.), or salient musical instruments (electric guitar, electronic music, etc) for music; colour for images; "type" for video (e.g. is the video clip a weather report, a film, a football game, etc.); language for text (both human languages and computing languages—HTML, C++, etc.); and emotions for speech (these can be linked to prosodic cues extractable from the signal by appropriate processing).

The tag generator 18 can use a variety of techniques for deriving the initial tag estimate from the tags (attributes-values) of the "similar" training examples. Here is one example of the way in which the tag generator 18 may generate an initial estimate for the value of a particular Boolean attribute A that may or may not be possessed by an input audiovisual work S. The value of attribute A for audiovisual work S will be designated $_SA$ and it can be "true" or "false". The logical expression A(S) stands for the statement "A is true for S", in other words, S possesses attribute A (and the value of $_SA$ is "true"), while the logical expression $\overline{A}(S)$ stands for the statement "A is false for S", in other words, S does not possess attribute A (and the value of $_SA$ is "false").

Assuming that the feature matcher 15 has identified a set $N_S$ of 10 "nearest neighbours" to the input work S, there will be a certain number, $O_S$, of works in set $N_S$ which possess attribute A (i.e. for which "A is true").

$$\text{i.e. } O_S = \text{card}\{S_i | S_i \in N_S \hat{} A(S_i)\} \quad (4)$$

If the attribute A is correlated with some observable feature of the signal (e.g. the "timbre" of a song), large values of $O_S$ are a good indicator that work S will also have attribute A, i.e. that $_SA$ is "true". For instance, if 9 out of the 10 acoustic nearest neighbors of a given input song are "Hard Rock" songs, then it is very likely that this input song will itself be a "Hard Rock" song.

However, attributes may not be uniformly distributed in the training set. For instance, considering once again the example of a song, 99% of the songs available in the training database 30 may be "Genre DanceMusic", while very few of the available songs may have "Main Instrument Bandoneon".

If $p(A(S)/O_S)$ is defined as the probability that A is true for S given the observation $O_S$ of a given number of A=true values in the set of nearest neighbors, and $p(\overline{A}(S)/O_S)$ is defined as the probability that A is false given the same observation. Then, according to Bayes' law, $$p(A(S)/O_S) = p(O_S/A(S)) \frac{P(A(S))}{P(O_S)} \quad (5)$$

where $p(O_S/A(S))$ is the likelihood distribution that a given number $O_S$ of works that are "nearest neighbours" of a further audiovisual work will have A=true if A=true for that further audiovisual work. This likelihood distribution $p(O_S/A(S))$ can easily be estimated by assuming that it is the same as a distribution $p(O_W/A(W))$ applicable for the examples in the training database. In other words, if the training database is examined, histograms can be made of the empirical frequencies of $O_W$ for all audiovisual works W of the applicable type in the database having A(W)=true.

Figure 8:
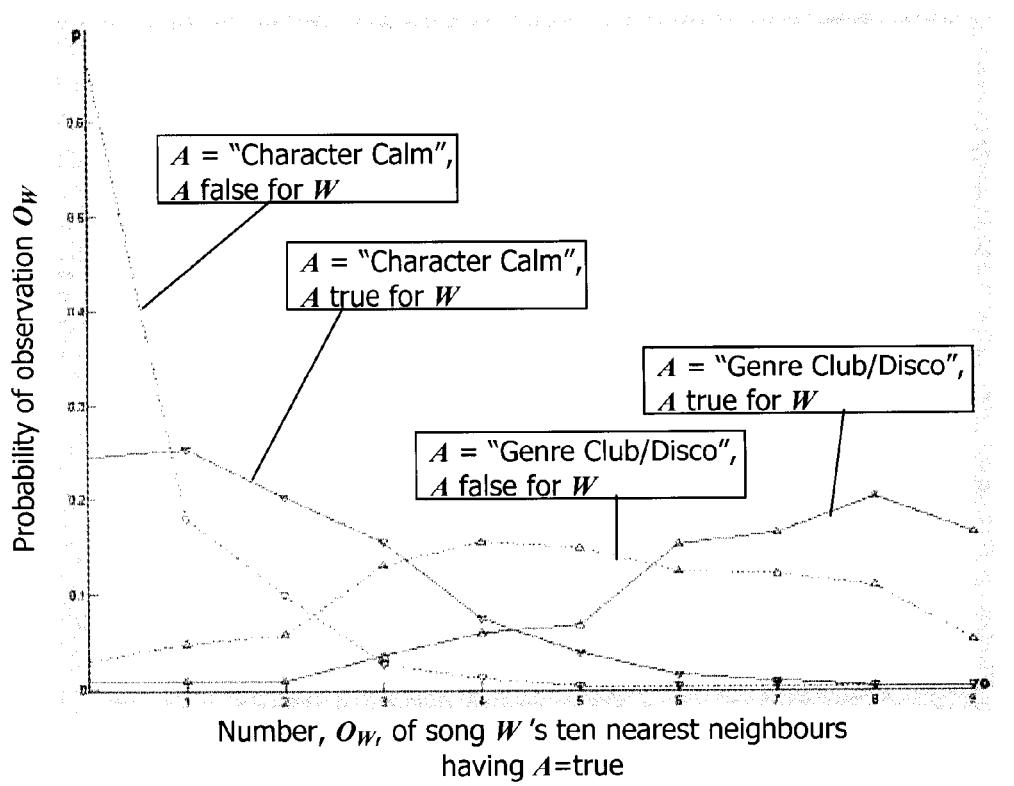
FIG. 8 is a graph illustrating likelihood distributions relating to the probability that a given song will have different numbers of nearest-neighbours having two particular attributes, when that song possesses, or does not possess, the attributes in question.

FIG. 8 shows two examples of such likelihood distributions computed for a particular training database relating to songs, in respect of attributes designated "Character Calm" and "Genre Club/Discotheque".

If it is assumed that the a priori probability that A is true for work S is the same as the a priori probability that A is false for S, i.e. $p(A(S))=p(\overline{A}(S))=0.5$, then $_SA$ can be estimated using maximum likelihood criteria $$A(S)=p(O_S/A(S))>p(O_S/\overline{A}(S)) \quad (6)$$

which, in words, means that A is true for work S if but only if the probability of seeing the current value for $O_S$ when A is true for S is greater than the probability of seeing the current value of $O_S$ when A is false for S (the probability $p(O_S/A(S))$ being estimated by assuming that it is the same as $p(O_W/A(W))$ and the probability $p(O_S/\overline{A}(S))$ being estimated by assuming that it is the same as $p(O_W/\overline{A}(W))$).

The above calculations relating to the determination of values for Boolean attributes can also be applied for estimation of values for "multi-valued" or "multi-class" attributes (i.e. attribute whose values are chosen from discrete possibilities—classes—within a set): if A is a multi-class attribute, the above approach is applied using one histogram per class.

Using the example given in FIG. 8, it can be seen that if 4 nearest neighbors out of 10 of a song have "Character Calm", then the likelihood of "Character Calm" applying also to any considered song in the training database is much greater than the likelihood of "Character Calm" not applying to that song—in other words, in these circumstances, "A is true" is much more likely than "A is false". The tag generator 18 can be designed to assume that the same likelihood distributions will apply to the input song. Thus, tag generator 18 would assign the tag <Character Calm=true> to the input song in these circumstances. However, if the 4 nearest neighbors out of 10 of a song in the training database have "Genre Club/Discotheque" then, based on the likelihood distributions shown in FIG. 8, the tag generator 18 would we estimate that the input song does not have "Genre Club/Discotheque" because, given the large number of songs of "Genre Club/Discotheque" present in the whole training set, it is surprising that there are not more of the nearest neighbours which have this attribute.

The fully-automatic music-tagging systems and methods according to the present invention can perform an iterative process in order to arrive at a final estimate of the tags of an input music file. This iterative process is described below with reference to FIGS. 9 to 13, which relate to an example in which a song is being tagged based on a training database which includes data for a collection of manually-tagged songs.

Figure 9:
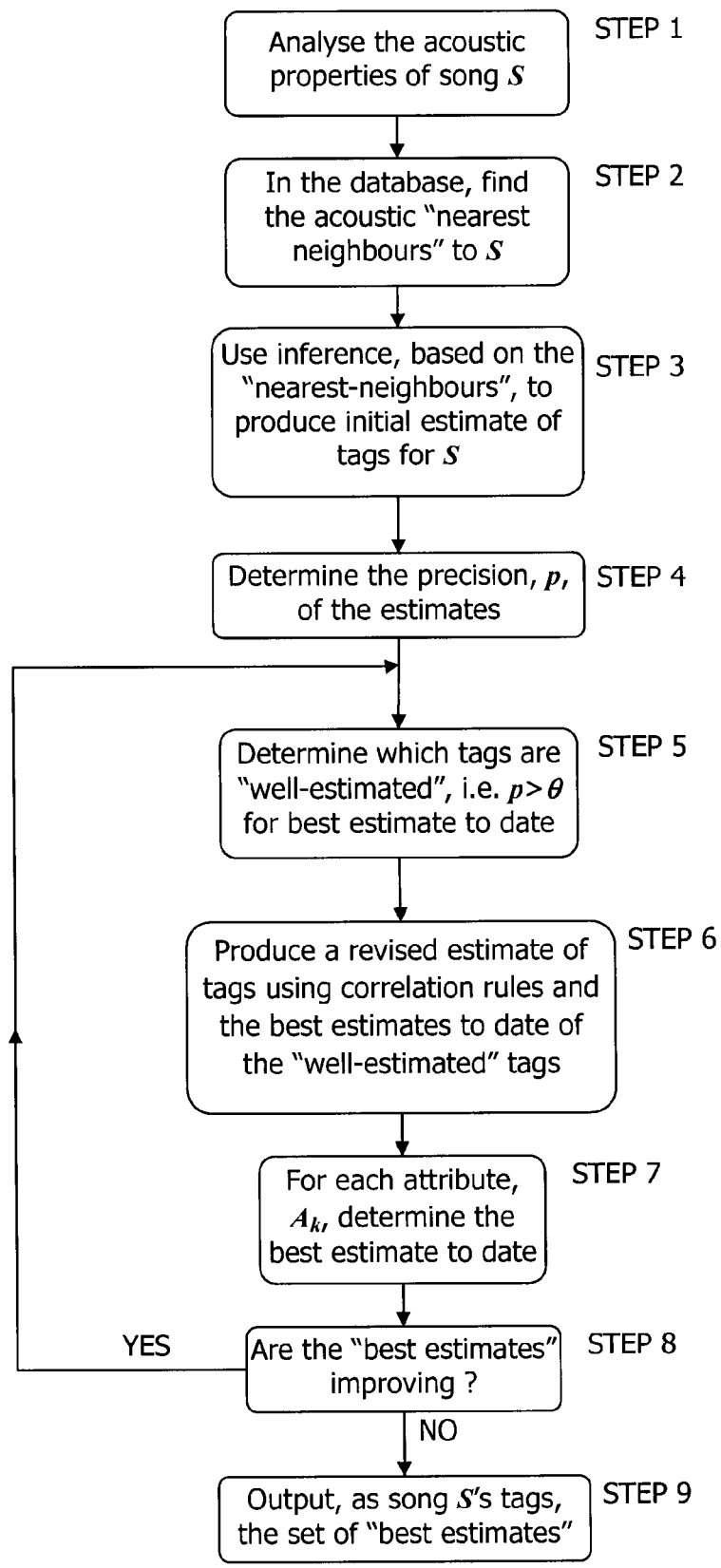
FIG. 9 is a flow diagram indicating the mains steps in an iterative fully-automatic music-tagging method according to one embodiment of the invention.

FIG. 9 is a flow chart indicating the main steps in one embodiment of an iterative process according to the present invention for tagging an input music file in a fully-automatic fashion. In this embodiment it is assumed not only that tags (attributes and associated values) are estimated for an input music file but also that a precision or confidence measure p can be associated with each estimate.

Before describing FIG. 9 in detail it is helpful to summarize notation that will be used in the description. It can be considered that the method of FIG. 9 is an iterative estimation of the values of a set $S_A$ of N attributes $A_k$, i.e. $S_A = \{A_k, k \in [0, N-1]\}$. At each iteration i, a set $\tilde{S}_A^i$ of attribute-value estimates $\tilde{A}_k^i$ is generated, i.e. $\tilde{S}_A^i = \{\tilde{A}_k^i, k \in [0, N-1]\}$, where $\tilde{A}_k^i$ is the estimate of the value of attribute $A_k$ made at iteration i. Each attribute-value estimate is associated with a precision $p(\tilde{A}_k^i)$. At each iteration i, the best estimate so far of the value of $A_k$ (in the iterations up to and including iteration i) is designated $best(\tilde{A}_k^i)$, i.e.

$$best(\tilde{A}_k^i) = \tilde{A}_k^m, m = \underset{j \leq i}{\operatorname{argmax}} p(\tilde{A}_k^j) \quad (7)$$

Now, in the iterative process of FIG. 9, the first step (which can be thought of as iteration 0) involves the generation of the initial tag estimate using signal-based inference. In this example, the acoustic properties of a song S corresponding to an input music file are analyzed (step 1). Next the examples in the training database are analyzed in order to determine which are the "nearest neighbours" of the input song S, based on global acoustic properties (step 2), and the initial tag estimate (the set $\tilde{S}_A^0$ of first estimates $\tilde{A}_k^0$ of the values of the input song's attributes) is generated by inferring attribute-values for song S based on the attributes of the "nearest-neighbours" (step 3)—this signal-based inference process can be the timbre-based process described above with reference to FIG. 8.

Next a confidence measure or "precision" $p(\hat{A}_k^0)$ is assigned to each of the estimates in the set $\tilde{S}_A^0$ (step 4)—for each member of the set $\tilde{S}_A^0$, this can be achieved by determining the ratio of the number of songs in the training database for which application of the same estimation process would result in an accurate estimate compared to the number of songs in the training database for which application of the same estimation process would yield a bad estimate. The values of the timbre-correlated attributes within set $\tilde{S}_A^0$ are typically estimated with good precision, i.e. $p(\tilde{A}_k^0)$ is high for these attributes, while cultural and subjective attributes are poorly estimated. The iterative process would be inefficient if it took into account the poorly-estimated attributes. Thus, in the example illustrated in FIG. 9, the next step (step 5) is to determine which of the tags estimated so far is "well-estimated". This can be achieved by comparing the values $p(\tilde{A}_k^0)$ with a threshold level θ, for example a value of θ representing 75% confidence in the estimate. Only the "well-estimated" tags will be used by the inference engine in order to produce a revised estimate of the tags.

Next, the inference engine 20 produces a revised tag estimate based on these "well-estimated" tags, by assuming that correlation rules applicable to the tags of music files in the training database apply also to the tags of the input music file (step 6). For the sake of simplicity, it will be assumed in this example that in order to determine the revised estimates of the input file's attributes (tags) the inference engine 20 makes use of decision trees that are trained based on the examples in the training database. The decision trees can be similar to that of FIG. 1, and the precision p of an estimate produced using such a decision tree can be based on the empirical observations of the percentage of songs in the training database for which a given conclusion is correct (i.e. (q/q+r)×100%).

Next, for each attribute, it is evaluated which of the estimates that has been produced so far is the best estimate of that attribute (step 7). Then a "stop condition" is applied to the iterative process, namely be checking whether or not the set of "best estimates" is actually improving. If there is no improvement in the "best estimates", i.e. the set of best($\tilde{A}_k^i$) is the same as the set of best($\tilde{A}_k^{i-1}$), then the iterative process can be stopped and the set of best($\tilde{A}_k^i$) can be output by the inference engine as the tags for the input music file (step 9).

It is not essential for the stop condition to judge whether or not there is zero change in the set of best estimates, it can judge whether or not the improvement in the set of best estimates has fallen below a threshold value. In other words, the stop condition can judge whether some measure of improvement observed from the last-but-one iteration to the current iteration, has fallen below a threshold level. This measure of improvement can be derived in a variety of ways, for example: the mean percentage improvement over the set of attributes, the sum of the (normalized) improvements for all attributes in the set, etc.

If, on the other hand, the check made at step 8 indicates that there is noticeable improvement in the set of best estimates, then the method returns to step 5, and steps 5 to 8 are repeated.

It can be considered that the first "run" of steps 5 to 8 represents iteration 1 of the overall estimation process and that subsequent "runs" of steps 5 to 8 represent the $2^{nd}$, $3^{rd}$ etc. iterations. Using the notation given above, for the ith iteration among the $1^{st}$ to last iterations: $\tilde{A}_k^i$ is built using a decision tree trained using $A_k$ as target attribute, and a set of non-categorical attribute-values $F_k^i$ defined as:

$$F_k^i = \{best(\tilde{A}_l^{i-1})/l \neq k, p(best(\tilde{A}_l^{i-1})) \geq \theta\} \quad (8)$$

where $\theta$ is the precision threshold. $F_k^i$ contains the best estimate so far (up to iteration i−1) of the value of every attribute other than $A_k$, provided that its precision is greater than $\theta$. The algorithm thus constructs successive estimates for each attribute using decision trees operating on the best estimates at previous steps, the whole process being bootstrapped by timbre inference.

FIGS. 10 to 13 illustrate an example scenario of the method described above with reference to FIG. 9, using a set of Boolean attributes including "Style Metal", "Character Warm", "Style Rap" (which are timbre-correlated attributes) and "TextCategory Love" and "Setup Female Singer", which are poor timbre estimates (the former being a cultural description, and the latter being too complex to be precisely described by timbre).

Figure 10:
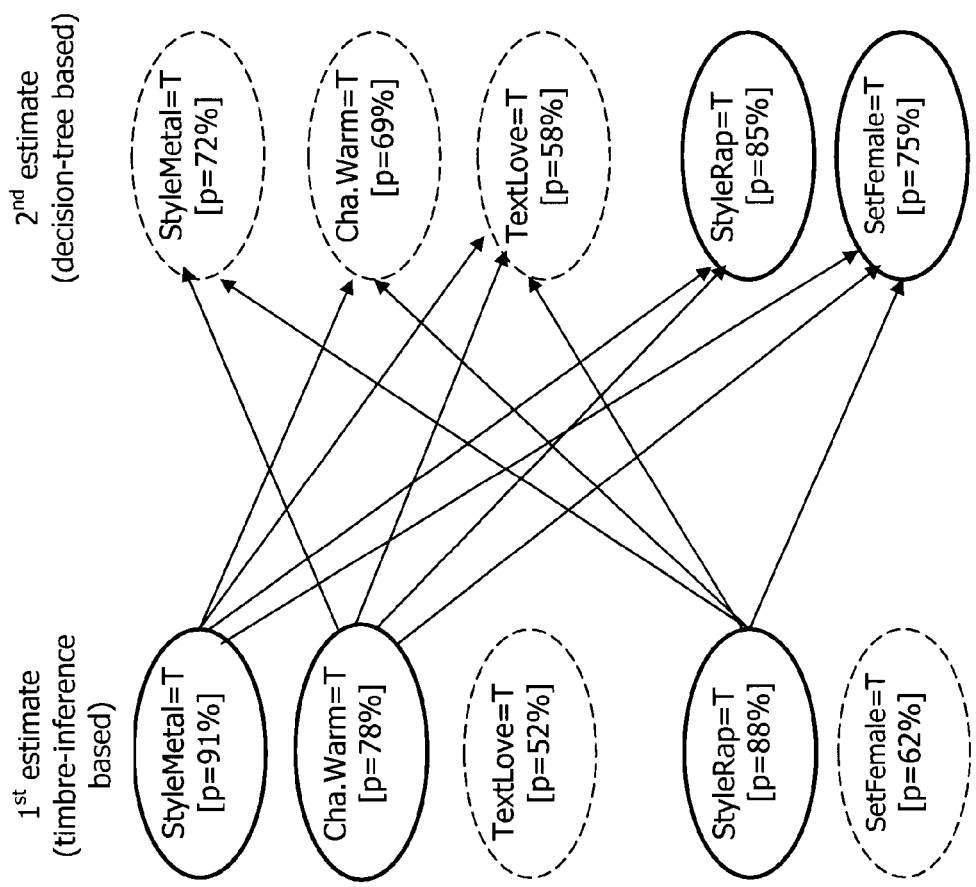
FIGS. 10 to 12 are diagrams illustrating different steps in one example of the implementation of the iterative process of FIG. 9.
Figure 11:
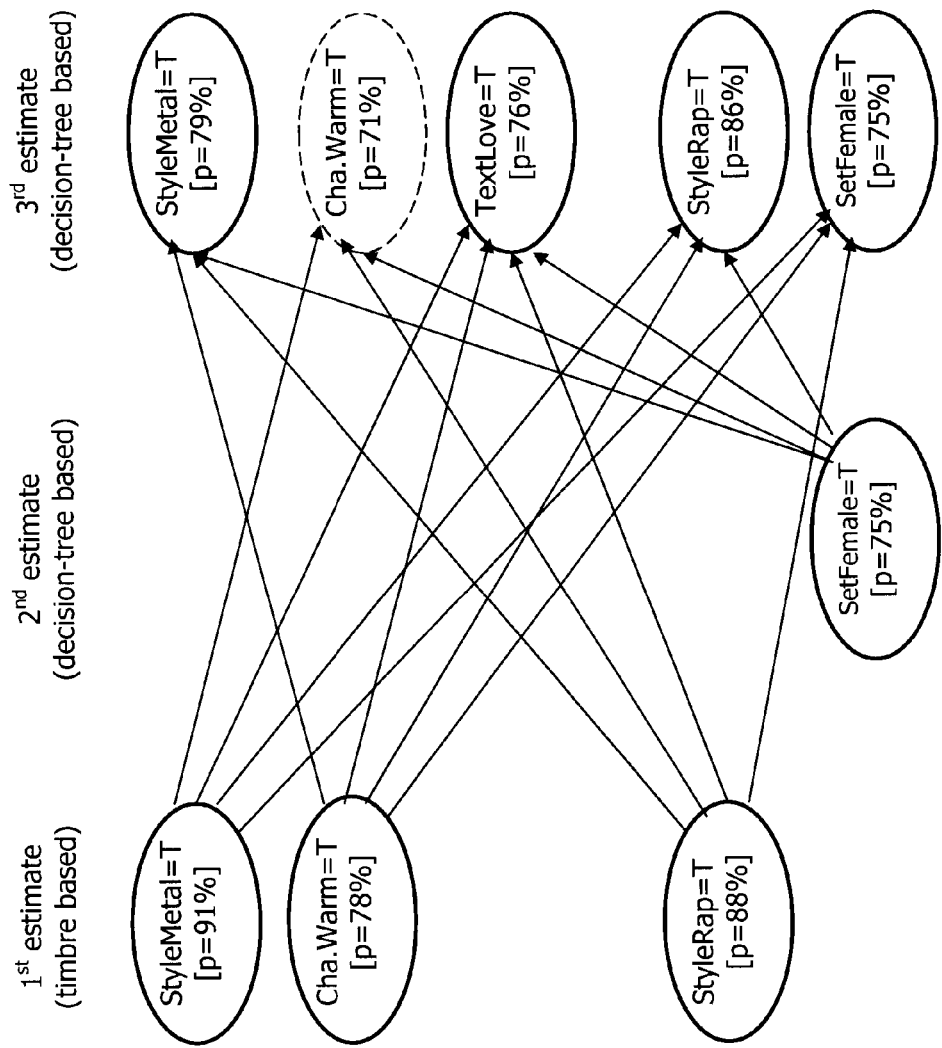
Figure 12:
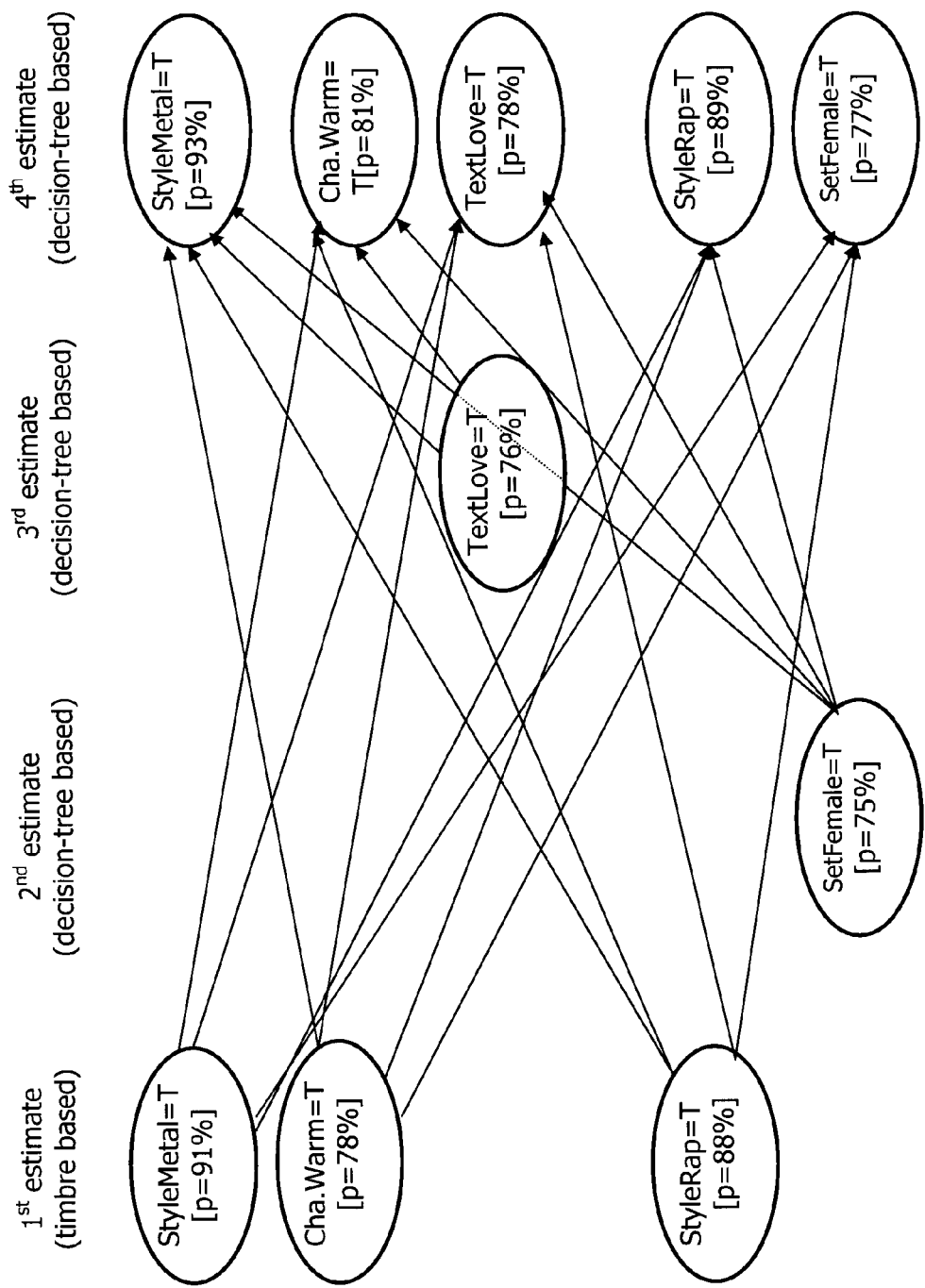

In FIGS. 10-12, a short-hand notation is used whereby "Style Metal=T" stands for "the attribute "Style Metal" has the value "true" ". Moreover, in FIG. 10-12, those attribute estimates which have precision less than 75% are ringed in dashed lines whereas those estimates having precision greater than or equal to 75% are ringed by solid lines. Moreover, in FIGS. 11 and 12, in order to simplify the diagrams, those estimates which are not being used in the prediction of the latest-shown set of estimates are omitted.

In accordance with the description above, according to this example scenario, the first set $\tilde{S}_A^0$ of estimates is built using timbre inference and, logically, contains good estimates of the timbre-correlated attributes, and poor estimates for the others.

At iteration number 1 (aiming to produce the second estimate), each of the attributes is estimated using a respective decision tree using, as non-categorical attributes, the estimates for the "well-estimated" attributes (only using estimates whose precision p is above 75%)—see FIG. 10. For instance, in this iteration "Style Metal" is predicted using a decision tree using "Character Warm=true" and "Style Rap=true" as values for the non-categorical attributes involved in the decision-making process. This yields an estimate of "Style Metal=true" which has a worse precision than the original estimate based on timbre inference. Similarly, the value (true/false) of the attribute "Setup Female Singer" is estimated using a decision tree operating on "Style Metal=true", "Character Warm=true" and "Style Rap=true": this yields an estimate which is better than the original estimate based on timbre inference.

At the next iteration (illustrated in FIG. 11) aimed at producing the third estimate of the input song's attributes, the estimate of "Setup Female Singer=true" produced in the preceding iteration, which happens to be above threshold $\theta$, is used (together with the best estimates of the values of the three timbre-based attributes: "Style Metal", "Character Warm" and "Style Rap") in a decision tree to give a good estimate of "TextCategory Love=true" (the fact that the singer is female can be correlated with the lyric contents of the song).

At the next iteration (illustrated in FIG. 12) aimed at producing a fourth estimate of the values of the input song's attributes, all best estimates so far are used in a decision tree to yield an estimate of "Style Metal=true" which is even better than the original estimate based on timbre inference (as it uses some additional cultural information).

Figure 13:
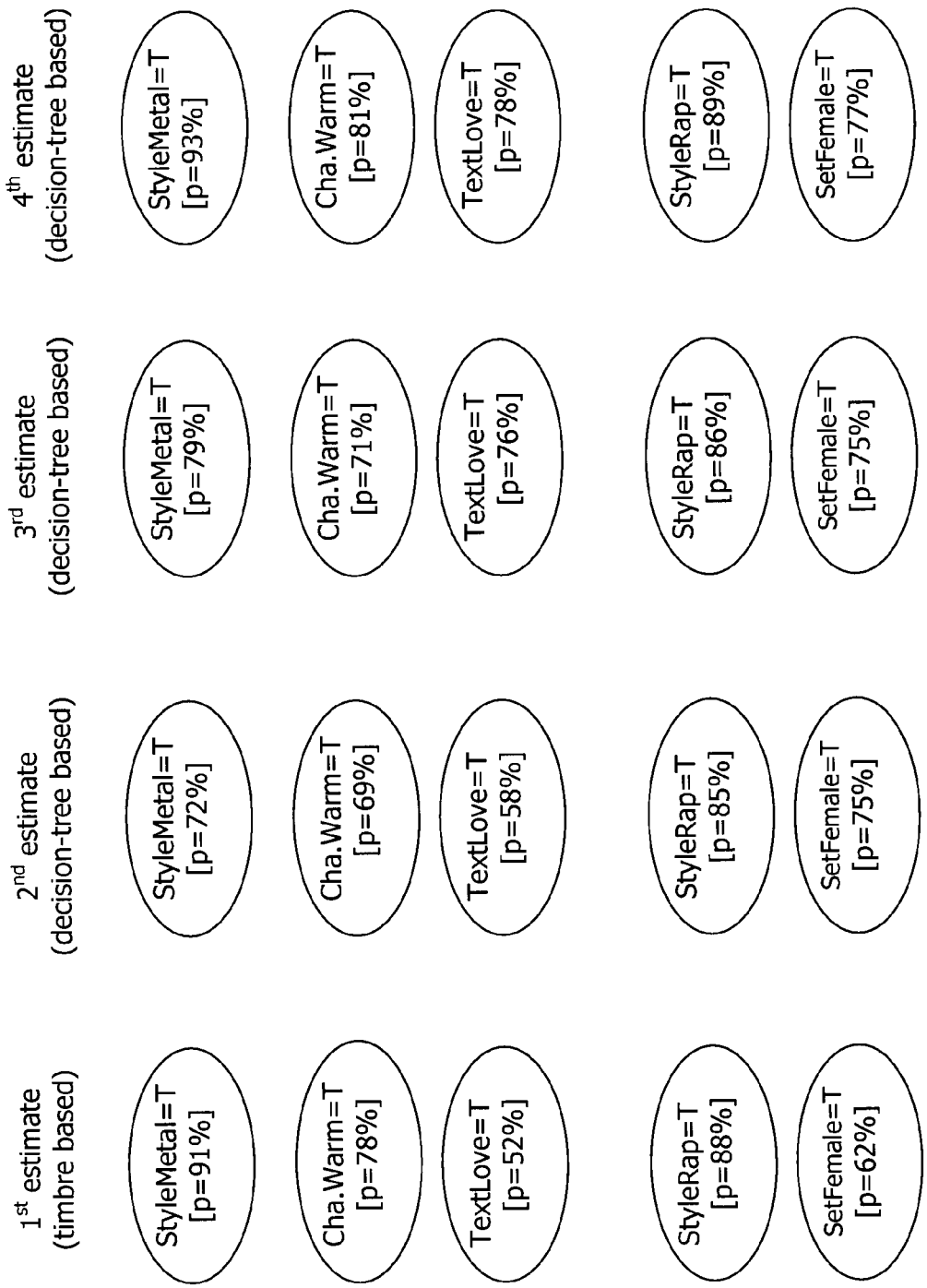
FIG. 13 is a diagram illustrating the various tag estimates generated in the example of FIGS. 10 to 12.

FIG. 13 summarizes the values of all the estimates included in the first to fourth sets produced as described above, and indicates the "precision" values associated with each estimate. It will be seen from FIG. 13 that, after a few iterations, it is already clear that the input music file can be assigned tags indicative of "Style Metal=true", "Character Warm=true", "Text Love=true", "Style Rap=true" and "Setup female=true" with a reasonably-high degree of certainty.

For a service provider who aims to build up a large content collection of fully-tagged audiovisual files for access by third parties, the fully-automatic tagging methods and systems according to the present invention allow the service provider to start from a kernel of manually-tagged files and build up a much larger collection of fully-tagged files, without significant further manual intervention. Similarly, an individual who is building up a personal collection of content (music, images, etc.) for access via a computer or mobile phone can begin by tagging the first files he puts into his collection and, later on, use the fully-automatic (or semi-automatic) tagging methods and systems according to the present invention in order to simplify and speed up the tagging of further content he adds to his collection.

Without tags, the data in a content collection is hard to access (whether when explicitly searching, when seeking recommendations of content similar to some selected work, etc). Thus, by providing tags automatically for audiovisual files, the present invention makes those audiovisual files capable of being accessed in a number of different ways.

Moreover, experiments were performed, using a test database of 5000 songs, to compare the performance of a prototype music-tagging method according to the present invention (as in the embodiment of FIG. 9) with known methods. Approximately two-thirds of the database was used to train the system embodying the invention, and the remaining third of the database was presented to the trained system as test examples for tagging. The tags assigned for these test examples were compared with actual tags that had been manually-assigned. These experiments showed that the methods according to the present invention yielded accurate tags on 15% more occasions than the state-of-the-art methods.

Incidentally, in order to be able to tag a work of a particular kind (song, text, video, etc.) with a reasonable degree of accuracy using methods and systems according to the present invention, it is not essential to have a training database including 1000s of training examples of this particular kind of work. Clearly, the automatic or semi-automatic tagging performed using the present invention will be more accurate if the number of training examples used for determining the applicable tag correlations is large. However, depending on the attribute, kind of work in question and the particular works used as training examples, the number of training examples needed to give reasonable accuracy in automatic assignment of a value to a particular attribute of a work can vary widely (from of the order of 50 training examples to of the order of 1000 training examples, with "of the order of 100" being a typical value).

Although the present invention has been described above in terms of particular embodiments thereof, the skilled person will readily understand that various changes and developments may be made in the details of the above-described embodiments, and other embodiments can be implemented, without departing from the scope of the present invention as defined in the appended claims.

For example, although in certain of the embodiments described above the inference engine 20 is illustrated as being composed of a data-mining unit and an estimation unit, it is to be understood that the inference engine could be constituted differently, for example with a single module both performing the analysis of correlations that exist between the tags of the training examples and making the prediction of the revised tags for the input music file.

Similarly, although in certain of the embodiments described above the training database is shown as forming part of a unitary apparatus which also comprises the inference engine, the skilled person will understand that, as mentioned above, the training database could be separate from the tagging apparatus.

More generally, although the annexed figures show particular distributions of functions between various system components, it is to be understood that the split of functions could be made differently. Moreover, in many implementations of the present invention it may not be possible to separate out discrete elements which perform the respective functions which, above, have been ascribed to the different elements of FIGS. 3-6. Various combinations of the modules may be merged into common units. In addition, the various modules making up the audiovisual-file tagging systems illustrated in FIGS. 3-6 do not necessarily represent physical devices. The corresponding functions can, and generally will, be implemented in software.

Certain of the examples described above involve the situation where the initial tag estimate and the revised tag estimate include estimates of values for the same set of attributes (but estimated with different levels of precision/confidence), which can be the full set of attributes defined in the system. This will not always be the case. In some embodiments of the invention the revised tag estimate will include estimates of values for a greater number of attributes and/or a different selection of attributes, compared to the attributes covered by the initial estimate.

The above-described examples relate to the case where all of the tags are Boolean, having binary values indicating either that a piece of music possesses a particular attribute or that the music does not possess that attribute. However, the skilled person will readily understand that the methods and systems of the invention can be applied, with appropriate (and straightforward) adaptations, regardless of whether the tags are Boolean or multi-valued (i.e. taking a value selected in a set of discrete values).

For example, although the iterative process for generating tags in a fully-automatic manner, described above with reference to FIGS. 9 to 12, makes use of decision trees involving Boolean attributes, it is well-known to produce decision trees involving non-categorical attributes which are multi-valued and/or numerical attributes. In such cases, the nodes of the decision tree will typically involve decisions of the type "is the value of attribute j for this example in the sub-set {green, blue, red}?", "is the value of attribute h$\geq$0.23 for this example?", etc. As before, the leaves of the decision tree will indicate which value should be assigned to the categorical attribute. Moreover, the decisions made at the nodes of the decision tree need not be decisions having binary answers, they could be decisions involving more than two answers (e.g. a node could ask the question "what is the colour of the image" and there could be a set of answers, and corresponding branches, for "colour=red", "colour=green", "colour=blue", "colour=yellow", etc.)

Moreover, although the iterative process for generating tags in a fully-automatic manner, described above with reference to FIGS. 9 to 12, makes use of decision trees for producing the revised tag estimates the skilled person will readily understand that other machine-learning/data-mining techniques can be used for inferring revised tags (or further-revised tags) during the iterative process. Moreover, this iterative process can also be applied in the case where the initial tag estimate is generated by a user (as in FIG. 4).

Finally, although the description above refers to the training database containing manually-tagged training examples, it may be decided to include in the training database data relating to automatically-tagged files (or semi-automatically-tagged files). For example, if an audiovisual file is tagged automatically (or semi-automatically) and there is a high level of confidence in the tags that have been assigned to this file, then it may be decided to include the attribute-value data for this file in the training database that is mined for correlations for use in future tagging by the system. If desired, a limit may be placed on the number of non-manually-tagged files for which data is included in the training database (e.g. in terms of an absolute number or, more probably, in terms of the proportion of non-manually-tagged files to manually-tagged files).

The invention claimed is:

1. A fully-automatic method of producing a set of tags for an input audiovisual file, the set of tags indicating values of a plurality of attributes of an audiovisual work of a defined type represented by said audiovisual file, the method comprising:
   analyzing properties of the audiovisual work represented by said input audiovisual file and evaluating a set of one or more features characterizing said properties of said audiovisual work;
   providing an initial estimate of said set of tags by automatically converting said set of features evaluated in the analyzing step to said initial estimate based on first correlations between physical properties of audiovisual works of said defined type and tags applicable to audiovisual works of said defined type;
   automatically applying, to the tags of said initial estimate, a set of one or more correlation functions defining a correlation among different tags of a set of training examples, to produce a revised tag estimate, said training examples being audiovisual works of said defined type corresponding to manually-tagged audiovisual files; and
   outputting a final result of the applying step as the set of tags for said input audiovisual file;
   wherein the correlation-function application step applies said correlation functions selectively to the tags of said initial estimate by applying said correlation functions to tags having a correlation with the physical properties of audiovisual works of said defined type and not applying said correlation functions to tags that are poorly correlated with the physical properties of audiovisual works of said defined type.

2. The fully-automatic audiovisual-file tag production method according to claim 1, wherein the initial-estimate providing step comprises:
identifying training examples having a similar set of feature values to a set of feature values evaluated for said audiovisual work in the analyzing step; and
producing the initial estimate of the set of tags for the input audiovisual file by inference based on the tags of the training examples identified in the identifying step.

3. The fully-automatic audiovisual-file tag production method according to claim 2, configured to tag music files, wherein the analyzing step quantifies, as a feature value of the sets of feature values, at least one property, selected in a group consisting of harmonic properties and timbre, of a subject musical work represented by a subject music file, and the identifying step further determines whether the training examples are similar to the subject musical work based on whether the harmonic properties and/or timbre of the training examples is/are similar to the harmonic properties and/or timbre of the subject musical work quantified in the analyzing step.

4. The fully-automatic audiovisual-file tag production method according to claim 1, wherein the initial-estimate providing step associates a confidence measure with each tag of said initial estimate, and the correlation-function application step applies said correlation functions only to estimated tags associated with a confidence measure indicating a degree of confidence greater than a threshold level.

5. The fully-automatic audiovisual-file tag production method according to claim 1, wherein the correlation-function application step is applied iteratively and, after each iteration, there is provided the step of determining the best estimate so far of the value of each tag, wherein the first iteration applies said correlation functions to said initial estimate of the set of tags, and subsequent iterations apply said correlation functions to the best estimate so far of each tag.

6. A non-transitory computer readable medium storing a computer program having a set of instructions which, executed by a computer apparatus, cause the computer apparatus to perform a fully-automatic method of producing a set of tags for an input audiovisual file, the set of tags indicating values of a plurality of attributes of an audiovisual work of defined type represented by said audiovisual file, the method comprising:
analyzing properties of the audiovisual work represented by said input audiovisual file and evaluating a set of one or more features characterizing said properties of said audiovisual work;
providing an initial estimate of said set of tags by automatically converting said set of features evaluated in the analyzing step to said initial estimate based on first correlations between physical properties of audiovisual works of said defined type and tags applicable to audiovisual works of said defined type;
automatically applying, to the tags of said initial estimate, a set of one or more correlation functions defining a correlation among different tags of a set of training examples, to produce a revised tag estimate, said training examples being audiovisual works of said defined type corresponding to manually-tagged audiovisual files; and
outputting a final result of the applying step as the set of tags for said input audiovisual file;

wherein the correlation-function application step applies said correlation functions selectively to the tags of said initial estimate by applying said correlation functions to tags having a correlation with the physical properties of audiovisual works of said defined type and not applying said correlation functions to tags that are poorly correlated with the physical properties of audiovisual works of said defined type.

7. The non-transitory computer readable medium according to claim 6, wherein the initial-estimate providing step comprises:
identifying training examples having a similar set of feature values to a set of feature values evaluated for said audiovisual work in the analyzing step; and
producing the initial estimate of the set of tags for the input audiovisual file by inference based on the tags of the training examples identified in the identifying step.

8. The non-transitory computer readable medium according to claim 7, storing a computer program having a set of instructions which, executed by a computer apparatus, cause the computer apparatus to perform a fully-automatic music-file tag production method, wherein the analyzing step quantifies, as a feature value of the sets of feature values, at least one property, selected in a group consisting of harmonic properties and timbre, of a subject musical work represented by a subject music file, and the identifying step further determines whether the training examples are similar to the subject musical work based on whether the harmonic properties and/or timbre of the training examples is/are similar to the harmonic properties and/or timbre of the subject musical work quantified in the analyzing step.

9. The non-transitory computer readable medium according to claim 6, wherein the initial-estimate providing step associates a confidence measure with each tag of the initial estimate, and the correlation-function application step applies said correlation functions only to estimated tags associated with a confidence measure indicating a degree of confidence greater than a threshold level.

10. The non-transitory computer readable medium according to claim 6, wherein the correlation-function application step is applied iteratively and, after each iteration, there is provided the step of determining the best estimate so far of the value of each tag, wherein the first iteration applies said correlation functions to said initial estimate of the set of tags, and subsequent iterations apply said correlation functions to the best estimate so far of each tag.

11. A fully-automatic audiovisual-file-tagging system implemented by an information processing apparatus configured to output a set of tags for an input audiovisual file that indicate values of a plurality of attributes of an audiovisual work of a defined type represented by said audiovisual file, the system comprising:
an analyzing unit configured to analyze properties of the audiovisual work represented by said input audiovisual file and evaluate a set of one or more features that characterize said properties of said audiovisual work;
an initial estimate providing unit configured to provide an initial estimate of said set of tags by the automatic conversion of said set of features evaluated by the analyzing unit to said initial estimate based on first correlations between physical properties of audiovisual works of said defined type and tags applicable to audiovisual works of said defined type;
a correlation function application unit configured to automatically apply, to the tags of said initial estimate, a set of one or more correlation functions configured to define a correlation among different tags of a set of training examples, to produce a revised tag estimate, wherein said training examples are audiovisual works of said defined type that correspond to manually-tagged audiovisual files; and a final result outputting unit configured to output a final result of the correlation function application unit as the set of tags for said input audiovisual file;

wherein the correlation function application unit is further configured to apply said correlation functions selectively to the tags of said initial estimate by applying said correlation functions to tags having a correlation with the physical properties of audiovisual works of said defined type and not applying said correlation functions to tags that are poorly correlated with the physical properties of audiovisual works of said defined type.

12. The fully-automatic audiovisual-file-tagging system according to claim 11, further comprising:

a memory storing attribute-value data for said set of training examples.

13. The fully-automatic audiovisual-file-tagging system according to claim 11, wherein the initial estimate providing unit comprises:

a training example identification unit configured to identify training examples having a similar set of feature values to a set of feature values evaluated for said input audiovisual work analyzed by the analyzing unit; and an initial estimate of the attribute values unit configured to produce the initial estimate of the set of tags for the input audiovisual file by inference based on the tags of the training examples identified by the training example identification unit.

14. The fully-automatic audiovisual-file-tagging system according to claim 13, configured to tag music files, wherein the analyzing unit is further configured to quantify, as a feature value of the sets of feature values, at least one property, selected in a group consisting of harmonic properties and timbre, of a subject musical work represented by a subject music file, and the training example identification unit is further configured to determine whether the training examples are similar to the subject musical work based on whether the harmonic properties and/or timbre of the training examples is/are similar to the harmonic properties and/or timbre of the subject musical work quantified by the analyzing unit.

15. The fully-automatic audiovisual-file-tagging system according to claim 11, wherein the initial estimate providing unit is further configured to associate a confidence measure with each tag of the initial estimate, and the correlation function application unit is further configured to apply said correlation functions only to estimated tags associated with a confidence measure indicating a degree of confidence greater than a threshold level.

16. The fully-automatic audiovisual-file-tagging system according to claim 11, wherein the correlation function application unit is further configured to apply iterations and, after each iteration, is configured to determine the best estimate so far of the value of each tag, wherein a first iteration applies said correlation functions to said initial estimate of the set of tags, and subsequent iterations apply said correlation functions to the best estimate so far of each tag.

* * * * *